(12) United States Patent
Markman et al.

(10) Patent No.: US 11,491,723 B2
(45) Date of Patent: Nov. 8, 2022

(54) CONSUMABLE ASSEMBLY

(71) Applicant: STRATASYS, INC., Eden Prairie, MN (US)

(72) Inventors: Caroline Jo Markman, Minneapolis, MN (US); Timothy Hjelsand, Waconia, MN (US); Kevin C. Johnson, Minneapolis, MN (US)

(73) Assignee: Stratasys, Inc., Eden Prairie, MN (US)

( * ) Notice: Subject to any disclaimer, the term of this patent is extended or adjusted under 35 U.S.C. 154(b) by 295 days.

(21) Appl. No.: 16/942,292

(22) Filed: Jul. 29, 2020

(65) Prior Publication Data

US 2021/0039317 A1  Feb. 11, 2021

Related U.S. Application Data

(60) Provisional application No. 62/884,847, filed on Aug. 9, 2019.

(51) Int. Cl.

| | |
|---|---|
| *B29C 64/118* | (2017.01) |
| *B33Y 40/00* | (2020.01) |
| *B65H 49/08* | (2006.01) |
| *B65H 55/02* | (2006.01) |
| *B65H 55/04* | (2006.01) |
| *B65H 57/12* | (2006.01) |
| *B65H 57/18* | (2006.01) |
| *B65D 63/10* | (2006.01) |
| *B29C 64/321* | (2017.01) |

(Continued)

(52) U.S. Cl.
CPC .......... *B29C 64/321* (2017.08); *B29C 64/118* (2017.08); *B29C 64/259* (2017.08); *B33Y 10/00* (2014.12); *B33Y 40/00* (2014.12); *B65D 63/10* (2013.01); *B65H 49/08* (2013.01); *B65H 55/02* (2013.01); *B65H 55/046* (2013.01); *B65H 57/12* (2013.01); *B65H 57/18* (2013.01)

(58) Field of Classification Search
CPC ...... B65H 55/02; B65H 55/046; B65H 49/08; B65H 57/12; B65H 57/18; B65D 63/10
See application file for complete search history.

(56) References Cited

U.S. PATENT DOCUMENTS

| | | | |
|---|---|---|---|
| 2,767,938 A | 10/1956 | Taylor, Jr. | |
| 4,067,441 A * | 1/1978 | Newman | B65H 55/046 |
| | | | 242/163 |
| 4,406,419 A | 9/1983 | Kotzur | |

(Continued)

*Primary Examiner* — William E Dondero
(74) *Attorney, Agent, or Firm* — Peter J. Ims; Westman, Champlin & Koehler, P.A.

(57) ABSTRACT

A consumable assembly for supplying filament to a 3D printer includes a spool-less filament coil, a payout tube, and a compressive band. The coil of filament is wound in a configuration having a generally cylindrical outer perimeter and an open interior; the coil has a payout hole extending from an inner layer of the coil to an outer layer of the coil and includes a filament strand configured to be withdrawn through the payout hole in response to a pull force, to thereby withdraw filament from the interior of the coil. The payout tube is disposed in the payout hole and provides a filament port. A compressive band is disposed over the outer layer and is configured to exert a compressive radial force on the coil so that the coil maintains its cylindrical shape without deformation, and the filament strand may be drawn through the filament outlet free of kinks, twists or tangles.

18 Claims, 16 Drawing Sheets

(51) Int. Cl.
*B29C 64/259* (2017.01)
*B33Y 10/00* (2015.01)

(56) References Cited

U.S. PATENT DOCUMENTS

| | | |
|---|---|---|
| 5,503,785 A | 4/1996 | Crump et al. |
| 6,547,995 B1 | 4/2003 | Comb |
| 7,604,470 B2 | 10/2009 | LaBossiere et al. |
| 8,419,996 B2 | 4/2013 | Swanson et al. |
| 8,647,102 B2 | 2/2014 | Swanson et al. |
| 8,926,882 B2 | 1/2015 | Batchelder et al. |
| 8,985,497 B2 | 3/2015 | Mannella et al. |
| 9,050,788 B2 | 6/2015 | Swanson et al. |
| 9,090,428 B2 | 7/2015 | Batchelder et al. |
| 9,902,588 B2 | 2/2018 | Mannella et al. |
| 2014/0158802 A1* | 6/2014 | Batchelder ............ B29C 64/321 |
| | | 242/157 R |
| 2018/0043627 A1 | 2/2018 | Barclay et al. |
| 2020/0307070 A1 | 10/2020 | Swanson et al. |

\* cited by examiner

CONSUMABLE ASSEMBLY

CROSS REFERENCE TO RELATED APPLICATION(S)

The present Application claims the benefit of U.S. Provisional Patent Application Ser. No. 62/884,847 entitled CONSUMABLE ASSEMBLY that was filed on Aug. 9, 2019, the contents of which are incorporated by reference in its entirety.

BACKGROUND

The present disclosure relates to assemblies for storing, transporting, and delivering strand-based materials, such as filaments, cables, wires, rope, and the like. In particular, the present disclosure preferably relates to coil assemblies for supplying consumable filament part and support materials to additive manufacturing systems for 3D printing of parts by material extrusion techniques. All references disclosed herein are incorporated by reference.

Additive manufacturing, also called 3D printing, is generally a process in which a three-dimensional (3D) part is built by adding material to form a 3D part rather than subtracting material as in traditional machining. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, Minn.), a 3D part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

A multi-axis additive manufacturing system may be utilized to print 3D parts using fused deposition modeling techniques. The multi-axis system may include a robotic arm movable in six degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to print layers of a 3D part in a single build plane, the geometry of part features may be used to determine the orientation of printing.

Whichever print system architecture is used, the printing operation for fused deposition modeling is dependent on extruding build materials from a print head at predictable and targeted extrusion rates, which in turn is dependent upon a reliable method for delivering consumable feedstock materials to the print head. There is an ongoing need for improved methods and apparatus for filament feedstock delivery in 3D printing systems.

SUMMARY

An aspect of the present disclosure is directed to a consumable assembly for use in a 3D printing system, the consumable assembly including a spool-less coil of filament, a payout tube, and a compressive band. The coil has an inner layer defining an open core region, an outer layer offset from the inner layer and defining an exterior generally cylindrical geometry of the coil, and substantially flat opposing side surfaces. The coil further has a payout hole extending from the inner layer of the coil to the outer layer of the coil. The payout tube is positioned in the payout hole and has a filament outlet proximate the outer layer to guide withdrawal of filament from the inner layer. The compressive band is disposed over the outer layer and is configured to exert a compressive radial force on the coil sufficient to maintain the exterior generally cylindrical geometry of the coil. The filament outlet is accessible through an opening in the compressive band. A filament of the coil is configured to be withdrawn through the payout tube and the filament outlet without rotation of the coil, beginning from the inner layer and moving towards the outer layer as the filament is withdrawn.

In another aspect, an apparatus includes a sheet material having a substantially rectangular configuration with opposed first and second ends and opposed first and second lengthwise edges. The apparatus includes a plurality of lines of weakness aligned parallel to the ends, wherein adjacent lines demarcate a panel therebetween, and wherein each line comprises a slot at the first and second lengthwise edges. A flap is disposed in a central region of the sheet, and a notch is disposed at one of the ends.

In yet another aspect, a method of delivering consumable filament to a 3D printing system is disclosed. The method includes withdrawing the filament through the payout tube and the filament outlet without rotation of the coil, beginning from the inner layer and moving towards the outer layer.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

Definitions

Unless otherwise specified, the following terms as used herein have the meanings provided below:

The terms "additive manufacturing system" and "3D printer" refer to a system that prints, builds, or otherwise produces parts, prototypes, or other 3D items and/or support structures at least in part using an additive manufacturing technique. The additive manufacturing system may be a stand-alone 3D printer, a robotic system, a sub-unit of a larger system or production line, and/or may include other non-additive manufacturing features, such as subtractive-manufacturing features, pick-and-place features, two-dimensional printing features, and the like.

The terms "preferred," "preferably," "example," and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the scope of the present disclosure.

Directional orientations such as "above," "below," "top," "bottom," and the like are made with reference to a layer-printing direction of a 3D part. In the embodiments shown below, the layer-printing direction is the upward direction along the vertical z-axis. In these embodiments, the terms "above," "below," "top," "bottom," and the like are based on the vertical z-axis. However, in embodiments in which the layers of 3D parts are printed along a different axis, such as along a horizontal x-axis or y-axis, the terms "above," "below," "top," "bottom," and the like are relative to the given axis.

The term "providing," such as for "providing a material," when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

All cited patents and printed patent applications referenced herein are incorporated by reference in their entireties.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure. The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

The present disclosure is directed to a consumable assembly for storing, transporting, and delivering filament materials for use in an extrusion-based additive manufacturing system. The consumable assembly includes a spool-less coil of part or support material filament wound in a spiral or figure-eight coil configuration and having a cylindrical shape with a generally cylindrical exterior and an open interior. A payout tube provides a pathway through the coil from its interior to its exterior. The filament coil is configured to allow withdrawal of a strand of filament through the payout tube without rotation of the coil by sequentially releasing loops of filament from the interior of the coil. The consumable assembly further includes a compressive band around an outer circumference of the coil to place a radial force about the exterior perimeter of the coil. The compressive band maintains the cylindrical shape of the coil, providing improved reliability in drawing an individual filament strand from the payout tube without kinks, twists, or entanglement. In exemplary embodiments, the compressive band serves a protective function by covering the coil and providing a barrier to damage or soiling. The consumable assembly may include a filament guide tube and may also include an adaptor, a printer engagement key, and a print head or print head components at a distal end of a filament guide tube.

FIGS. 1A-1D show additive manufacturing system 10, with different arrangements, denoted as 10a, 10b, 10c and 10d, illustrated for use with embodiments of the consumable assembly of the present disclosure. System 10 is an extrusion-based additive manufacturing system for printing or otherwise building 3D parts and support structures using a layer-based, additive manufacturing technique, where the 3D part can be printed from part material and support structures can be printed from support material. Suitable extrusion-based additive manufacturing systems for system 10 include fused deposition modeling systems developed by Stratasys, Inc., Eden Prairie, Minn. under the trademark "FDM".

Figure 1A:
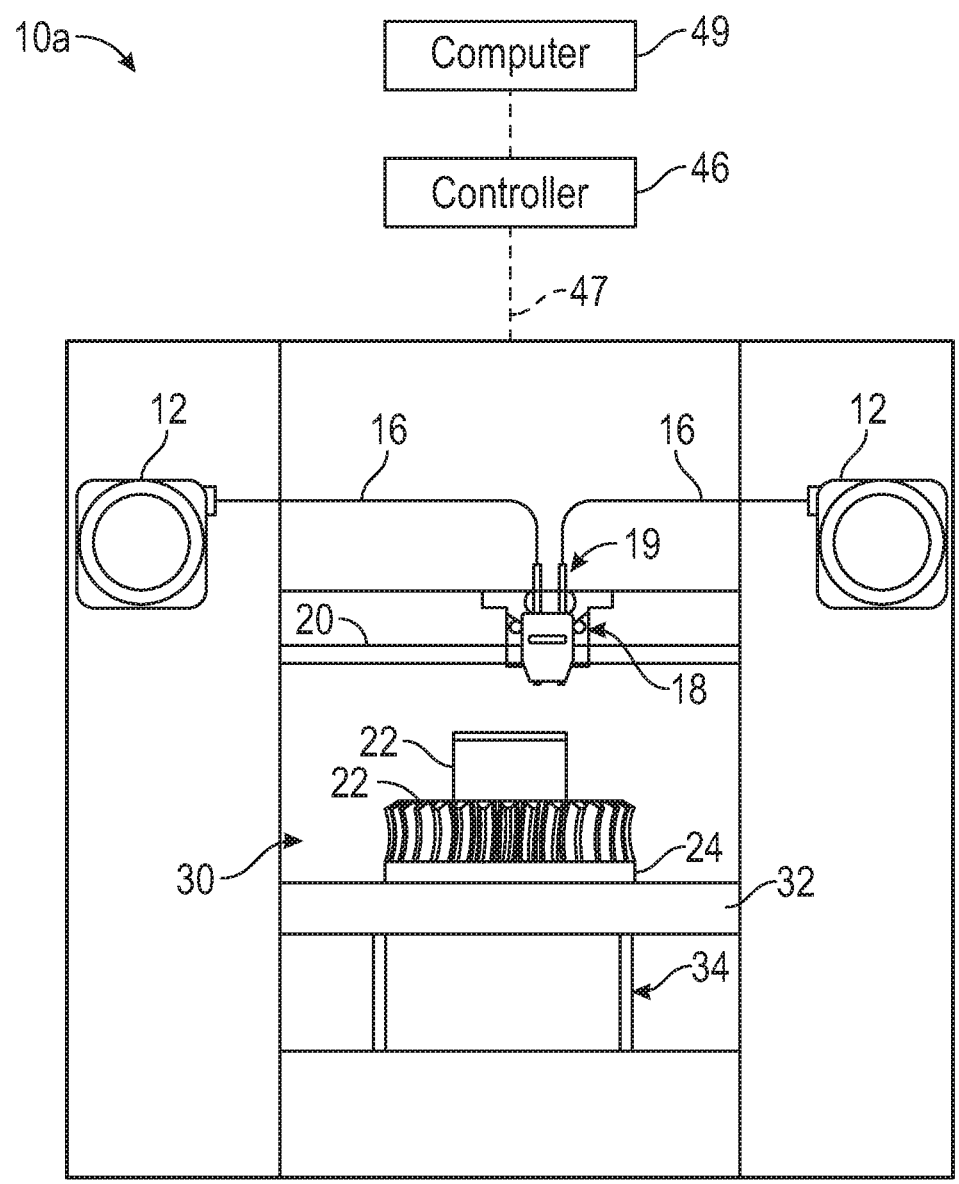
FIG. 1A shows a first arrangement of an additive manufacturing system suitable for use with consumable assemblies of the present disclosure.

In the illustrated embodiment of FIG. 1A, system 10 includes chamber 30, platen 32, platen gantry 34, an extrusion head or print head 18, head gantry 20, and consumable assemblies 12. Chamber 30 is an enclosed environment that contains platen 32 and any printed parts. Chamber 30 can be heated (e.g., with circulating heated air) to reduce the rate at which the part and support materials solidify after being extruded and deposited. In alternative embodiments, chamber 30 can be omitted and/or replaced with different types of build environments. For example, parts can be built in a build environment that is open to ambient conditions or may be enclosed with alternative structures (e.g., flexible curtains).

Platen 32 is a platform on which printed parts and support structures are printed in a layer-by-layer manner. In some embodiments, platen 32 may also include a flexible polymeric film on which the printed parts and support structures are printed. In the illustrated example, print head 18 is a dual-tip extrusion head configured to receive consumable filaments from consumable assemblies 12 (e.g., via guided tubes 16) for printing 3D part 22 and support structure 24 on platen 32. Consumable assemblies 12 are embodiments of the present disclosure, wherein the filament guide tubes are component of the printer 10a that receive filament from the consumable assemblies. One of the consumable assemblies 12 may contain a supply of a part material, such as a high-performance part material, for printing printed part 22 from the part material. The other consumable assembly 12 may contain a supply of a support material for printing support structure 24 from the given support material.

The consumable assemblies 12 are illustrated schematically. As will be discussed in more detail below, consumable assembly 12 includes coil 54 with a compressive band that may be provided in the form of compressive band 86, wrap 106, other structures discussed in this disclosure, or combinations thereof. Moreover, assembly 12 may include additional components to secure the coil and compressive band of the assembly together, such as container 14, box 48, straps 118, tape, and/or other fasteners, for example. In an exemplary method of use, the assembly 12 is connected to a 3D printer to supply filament to the printer. The compressive band remains on the coil 54 during use. Thus, the compressive band is not packaging material, but is a significant feature of the consumable assembly 12.

Platen 32 is supported by platen gantry 34, which is a gantry assembly configured to move platen 32 along (or substantially along) a vertical z-axis. Correspondingly, print head 18 is supported by head gantry 20, which is a gantry assembly configured to move print head 18 in (or substantially in) a horizontal x-y plane above chamber 30. In an alternative embodiment, platen 32 may be configured to move in the horizontal x-y plane within chamber 30 and print head 18 may be configured to move along the z-axis. Other similar arrangements may also be used such that one or both of platen 32 and print head 18 are moveable relative to each other over a desired number of degrees of freedom. Platen 32 and print head 18 may also be oriented along different axes. For example, platen 32 may be oriented vertically and print head 18 may print printed part 22 and support structure 24 along the x-axis or the y-axis.

The print head 18 can have any suitable configuration. In addition to the dual-tip embodiment as illustrated, examples of suitable devices for print head 18, and the connections between print head 18 and head gantry 20 include those disclosed in Crump et al., U.S. Pat. No. 5,503,785; LaBossiere, et al., U.S. Pat. No. 7,604,470; Swanson et al., U.S. Pat. Nos. 8,419,996 and 8,647,102; Batchelder U.S. Pat. No.

8,926,882; and Barclay et al. U.S. Published Patent Application 20180043627. In one example, during a build operation, one or more filament drive mechanisms, such as drive mechanism 19, are directed to intermittently and successively feed segments of the modeling and support materials (e.g., consumable filaments via guide tube assemblies 16) to print head 18 from consumable assemblies 12.

System 10 also includes controller 46, which can include one or more control circuits configured to monitor and operate the components of system 10a. For example, one or more of the control functions performed by controller 46 can be implemented in hardware, software, firmware, and the like, or a combination thereof. Controller 46 can communicate over communication line 47 with chamber 30 (e.g., with a heating unit for chamber 30), print head 18, and various sensors, calibration devices, display devices, and/or user input devices.

System 10 and/or controller 46 can also communicate with computer 49, which can include one or more discrete computer-based systems that communicate with system 10 and/or controller 46, and may be separate from system 10, or alternatively may be an internal component of system 10. Computer 49 includes computer-based hardware, such as data storage devices, processors, memory modules, and the like for generating and storing tool path and related printing instructions. Computer 49 may transmit these instructions to system 10 (e.g., to controller 46) to perform printing operations.

A digital model representative of a 3D part to be printed can be created, such as by scanning an existing 3D object to create a digital image file, or such as by drawing a 3D model using a computer-aided design (CAD) program. The digital model and/or instructions for printing the model can be loaded into computer 49. The computer 49 can communicate with controller 46, which serves to direct the system 10 to print the 3D part 22 and optionally, a support structure 24. Part material is deposited in layers along toolpaths that build upon one another to form the 3D part 22.

Figure 1B:
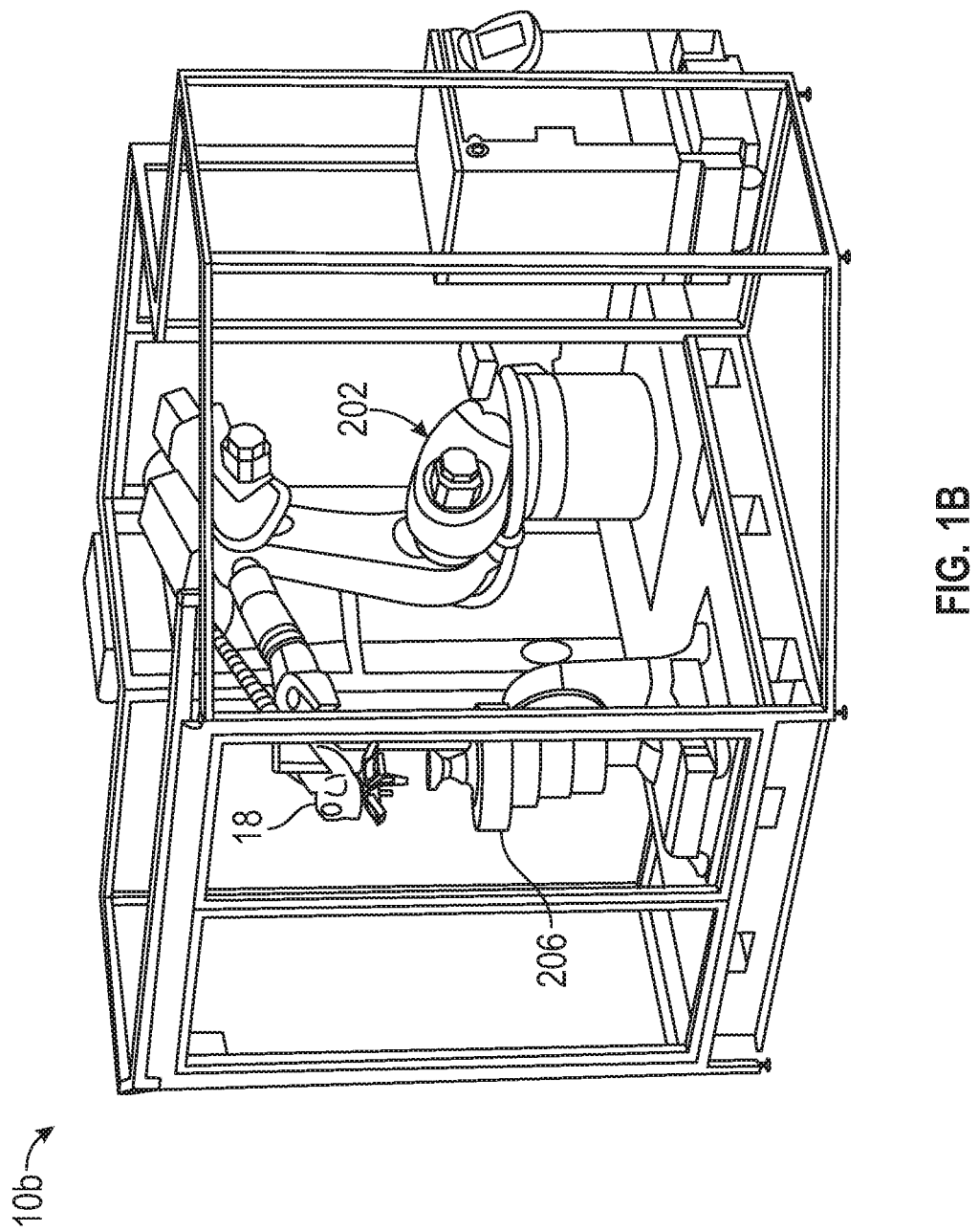
FIG. 1B shows a second arrangement of an additive manufacturing system suitable for use with consumable assemblies of the present disclosure.

FIG. 1B is a perspective view of a multi-axis robotic build system 10b that may be used for building 3D parts utilizing two-dimensional tool paths, three-dimensional tool paths and combinations thereof. System 10b includes in one embodiment a robotic arm 202 capable of movement along six axes. An exemplary robotic arm is an industrial robot manufactured by KUKA Robotics of Augsburg, Germany. While six axes of motion are discussed for the robotic arm 202 from a stationary base, it should be understood that additional axes or other movements are also amenable to use with the embodiments of the present disclosure, without departing therefrom. For example, the robotic arm 202 could be mounted to move on a rail or a gantry to provide additional degrees of freedom. The robotic arm 202 carries a print head 18 for printing parts from a filament feedstock, which may be provided from various embodiments of the consumable assembly of the present disclosure as described herein. A build platform 206 is provided, which in one embodiment is movable along two axes of rotation, rotation about the z-axis, and tilting (rotation) about the x-axis. A controller contains software and hardware for controlling the motion of the robotic arm 202 and the build platform 206, as well as the printing operation of the print head 18. The system 10b optionally may be housed within a build structure.

Figure 1C:
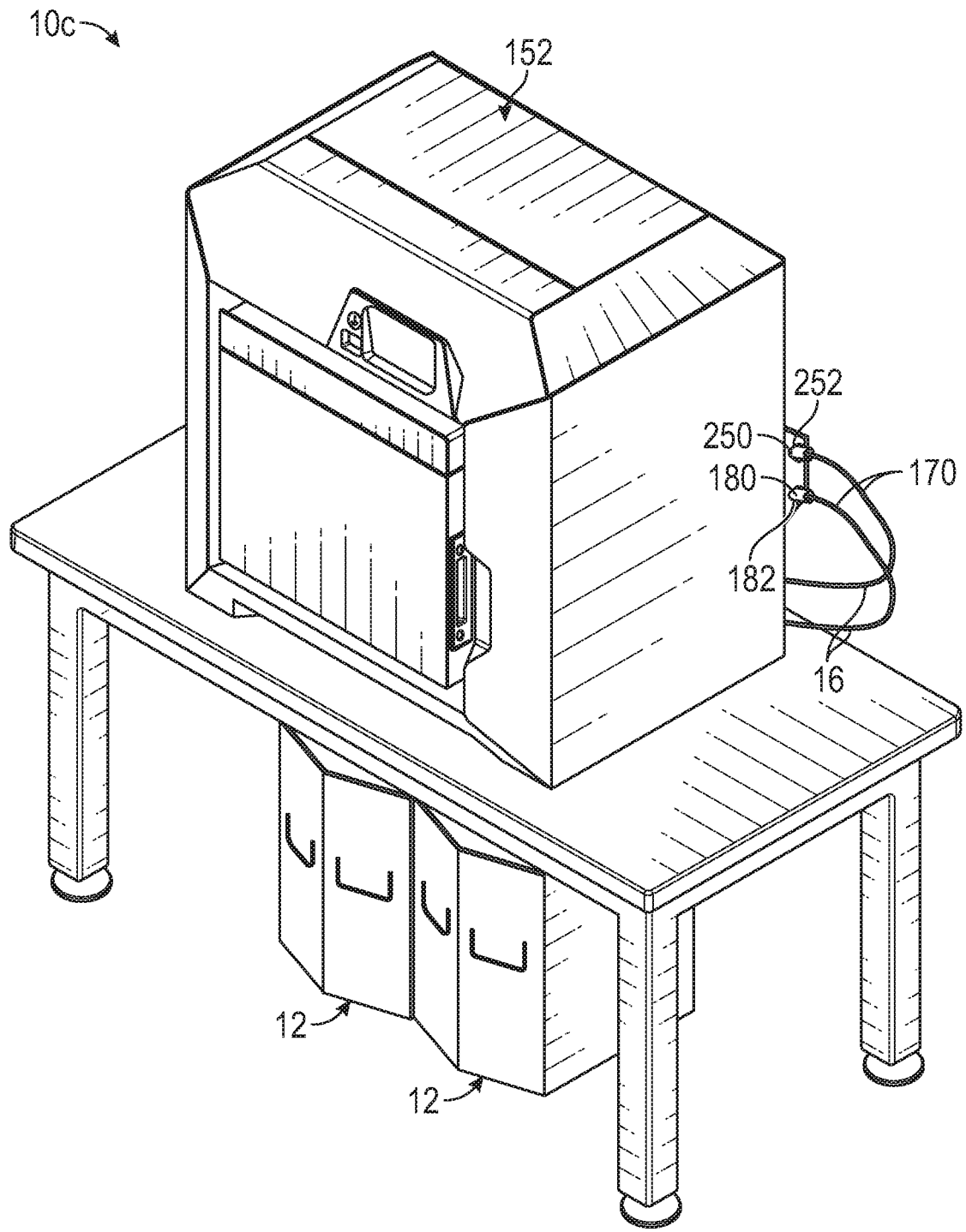
FIG. 1C shows a third arrangement of an additive manufacturing system suitable for use with consumable assemblies of the present disclosure.

FIG. 1C is a schematic view of an additive manufacturing system 10c. The additive manufacturing system 10c includes a 3D printer 152 where consumable assemblies 12a and 12b according to the present invention are positioned a distance from the 3D printer 152, outside the humidity controlled build chamber. While consumable assemblies 12 are illustrated as located below the 3D printer 152, it is also contemplated that one or more consumable assemblies are located in any location or within bays or shelves integral with or in use with the 3D printer 152. The consumable assemblies 12 shown in FIG. 1C include guide tubes 170 that connect to receptacles 182 and 252 within the printer 152 via key 180 and key 250, respectively, such as is further described in U.S. Patent Application Ser. No. 62/826,578 and Stratasys U.S. Pat. No. 9,050,788, which are hereby incorporated by reference. Optionally, keys 180 and key 250 each are elastomeric and each have a different configuration or shape, such that each key is configured or shaped to be positioned within the associated receptacle 182 and 252 having a complementary configuration to aid in ensuring that proper part material and/or support material are utilized to print the part.

Figure 1D:
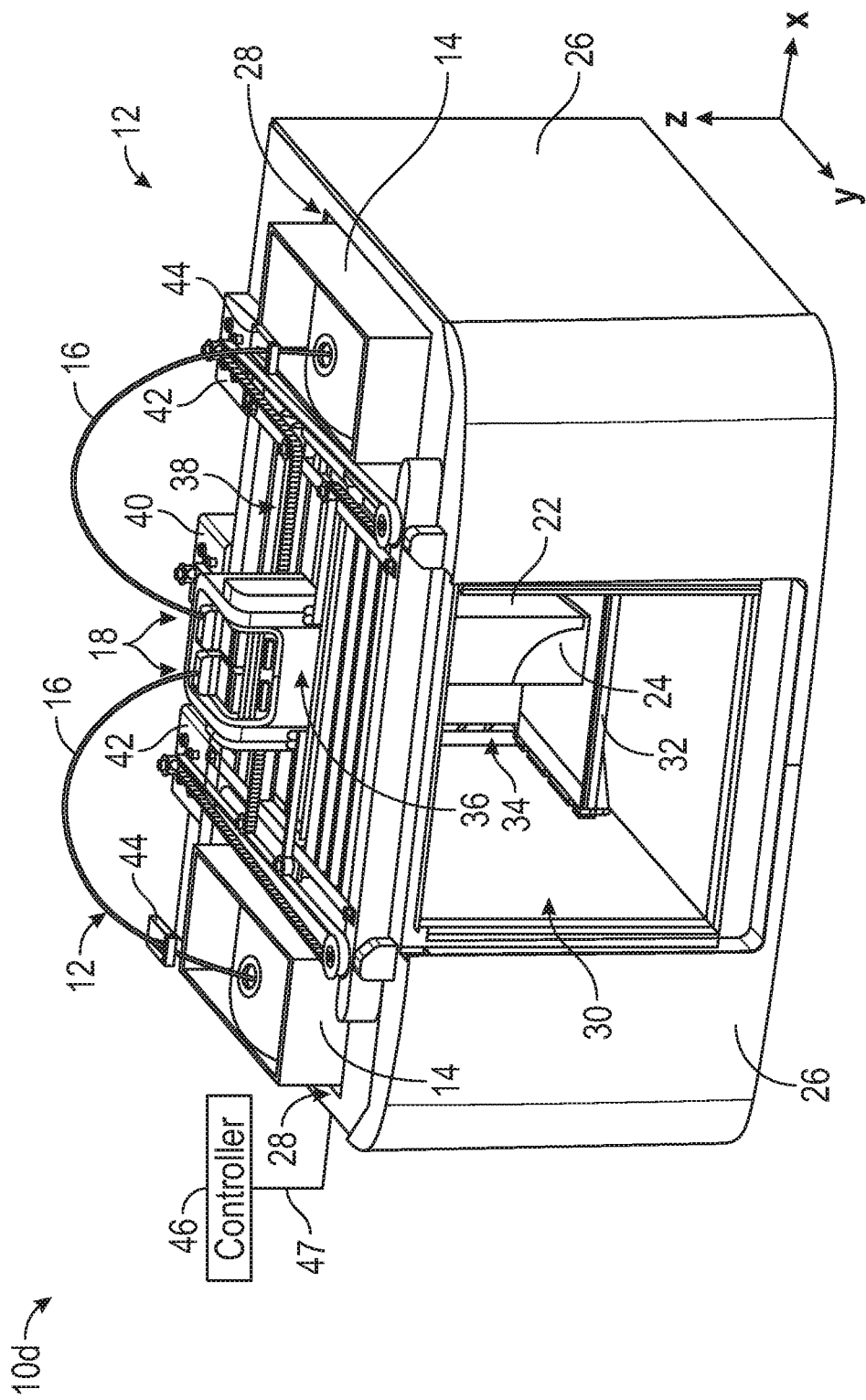
FIG. 1D shows a fourth arrangement of an additive manufacturing system suitable for use with consumable assemblies of the present disclosure.

FIG. 1D shows system 10d in use with two consumable assemblies 12 of the present disclosure, where each consumable assembly 12 is an easily loadable, removable, and replaceable container device that retains a coil of consumable filament for printing with system 10. In the embodiment shown in FIG. 1D, each coil assembly 12 includes container portion 14, guide tube 16, and print head 18, where container portion 14 retains a coil 54 of a consumable filament 56. Guide tube 16 interconnects container portion 14 and print head 18 to supply successive segments of the consumable filament from container portion 14 to print head 18. In this embodiment, guide tube 16 and print head 18 are components of coil assembly 12, and may be interchanged to and from system 10 with each coil assembly 12. In the illustrated embodiment, system 10d includes system casing 26, two bays 28, chamber 30, platen 32, platen gantry 34, head carriage 36, head gantry 38, z-axis motor 40, a pair of x-y motors 42 and sensor assemblies 44.

Figure 2:
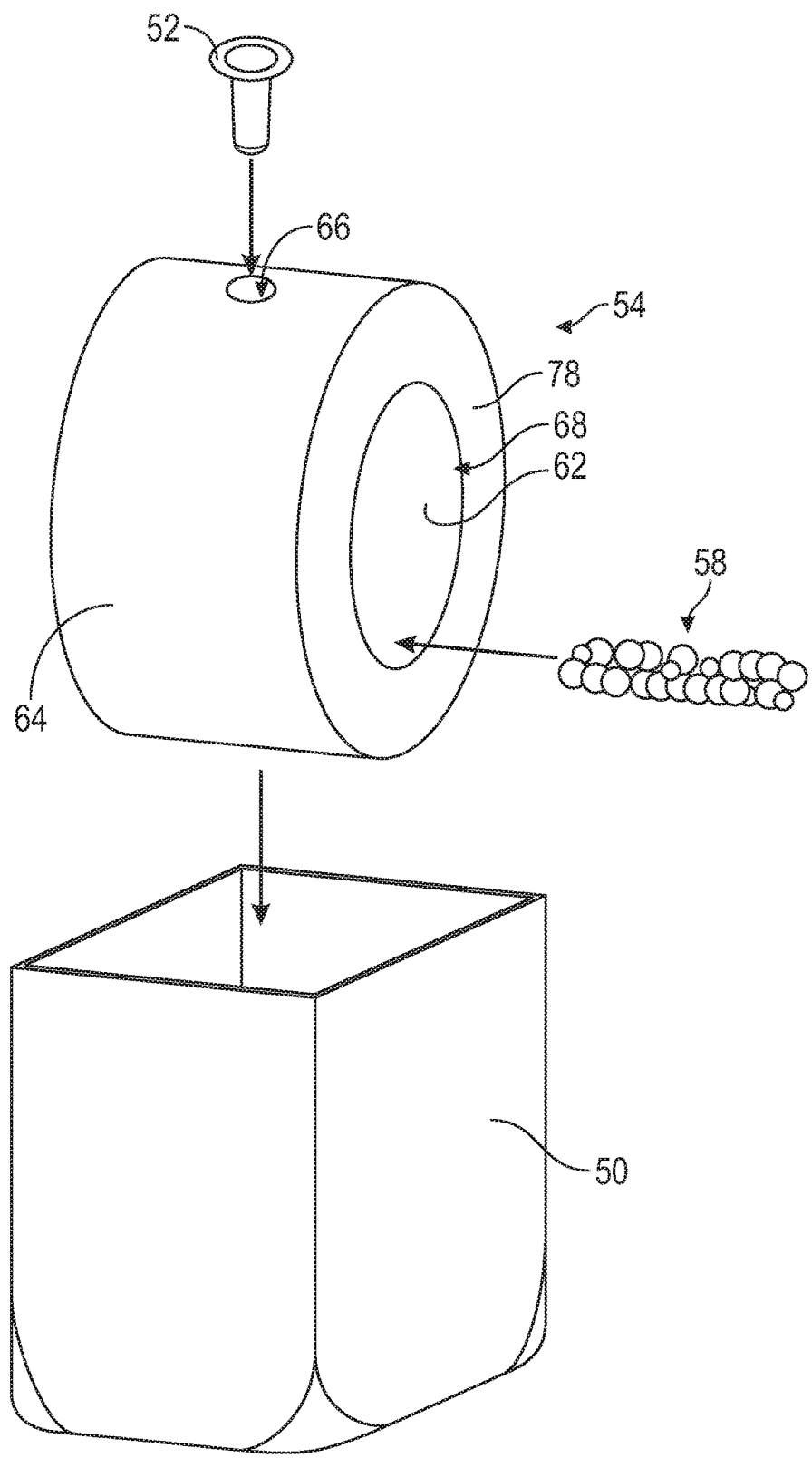
FIG. 2 is an exploded perspective view of a container portion of a consumable assembly of the prior art.
Figure 3:
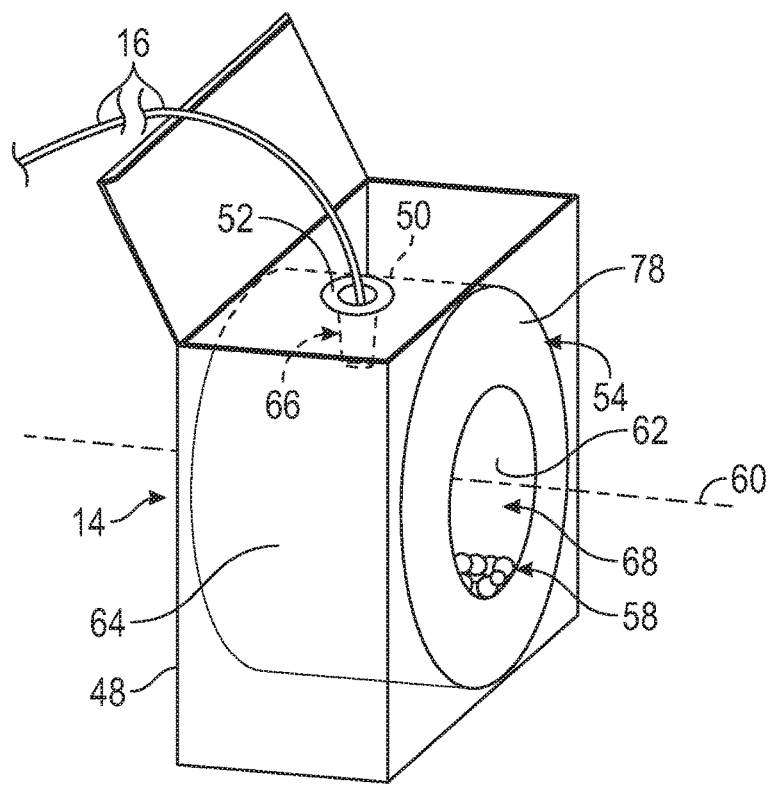
FIG. 3 is a top, front perspective view of a consumable assembly of the prior art, which includes a coil and displaceable bodies that function as a permeable hub for the coil.

A consumable assembly of the prior art is illustrated in FIGS. 2 and 3 includes box 48, optional bag liner 50, payout tube 52, spool-less coil 54 of a consumable filament 56, and displaceable bodies 58. In the shown example, box 48 is a rigid or semi-rigid container for coil 54 and may include a variety of indicia and graphics for identifying the material type for coil 54. In embodiments including a guide tube and a print head, box 48 may also include a compartment to retain payout guide tube 52 and print head 18 during transportation and storage. As shown in FIGS. 2 and 3, coil 54 is preferably oriented vertically when used with system 10, such that coil 54 has a central axis 60 that is substantially aligned in the horizontal x-y plane.

Figure 4:
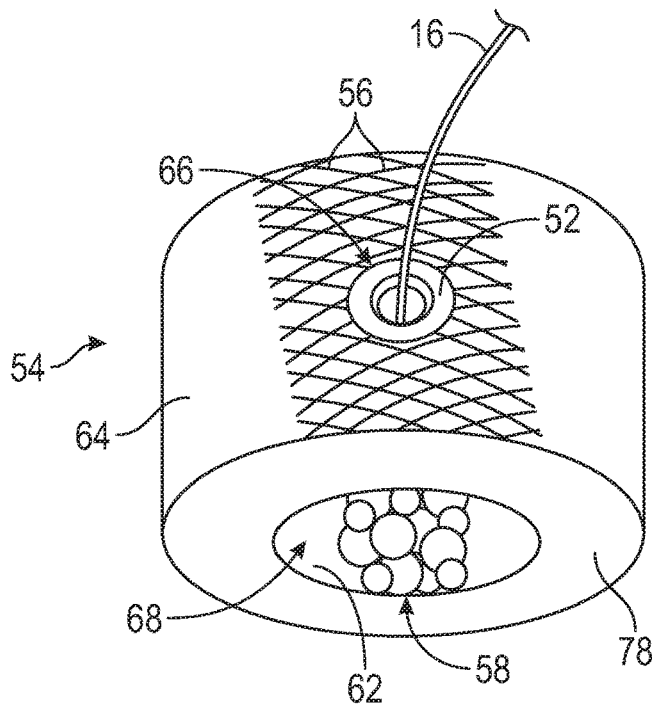
FIG. 4 is a top perspective view of the coil, the displaceable bodies, a payout tube, a guide tube of a consumable assembly of the prior art.
Figure 5:
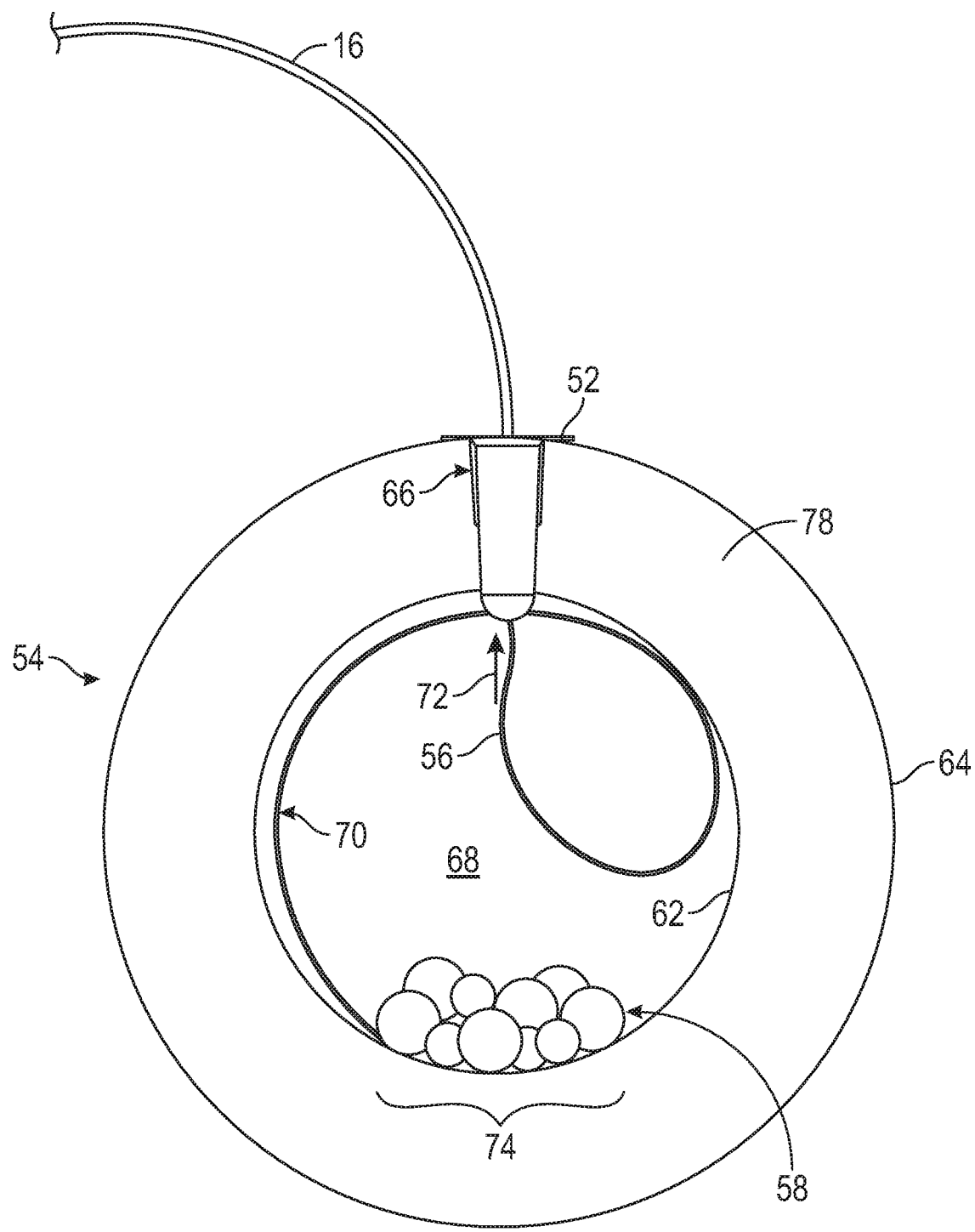
FIG. 5 is a side illustration of the coil, displaceable bodies, payout tube, and guide tube of the prior art consumable assembly of FIGS. 2-4, illustrating a payout process.
Figure 8:
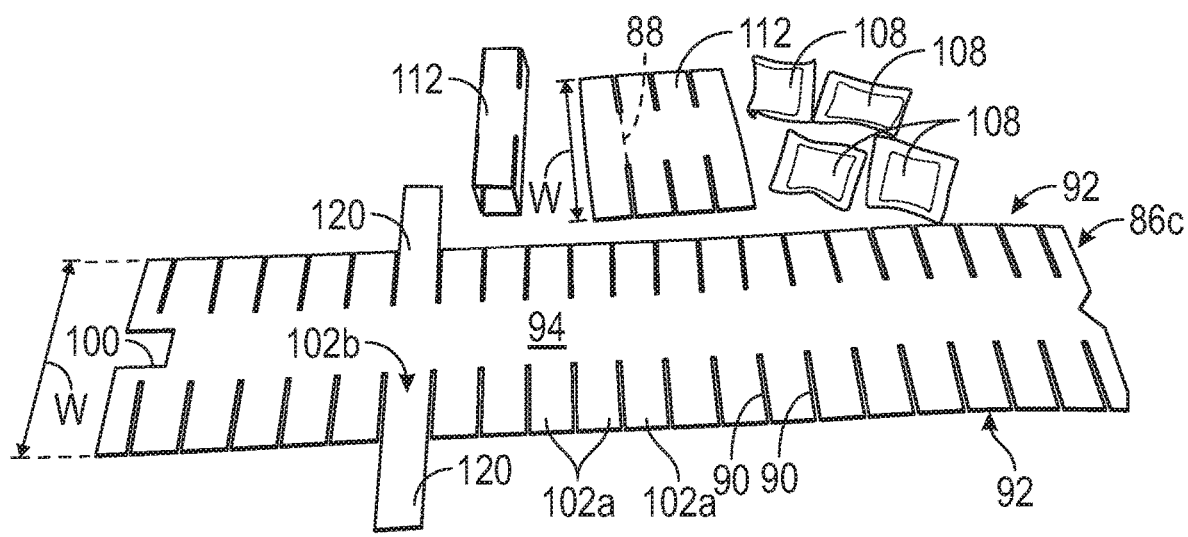
FIG. 8 is a plan view showing various components of a third embodiment of a compressive band assembly.

As shown in FIGS. 4 and 5, filament 56 of coil 54 may be wound in a spiral or figure-8 configuration having a generally cylindrical shape with a generally cylindrical exterior (at outer layer 64), an open or hollow interior (at inner layer 62) and substantially flat opposing lateral sidewalls 78, as is well known for filaments such as wire, rope, communication cables, and the like, and is described in references such as U.S. Pat. Nos. 2,767,938 and 4,406,419 and the references cited therein. The outer layer 64 is described as being generally cylindrical because in some cases, a "crowning" effect is exhibited, in that that circumference is slightly larger in a central region of the outer layer 64 remote from the edge regions near the lateral sidewalls 78. The figure-8 or spiral configuration of coil 54 has an innermost layer 62 and an outermost layer 64, and the winding technique provides an exit or payout hole 66 that extends through coil interior 54 between inner layer 62 and outer layer 64. Payout tube 52 is a rigid component that is inserted into payout hole 66 and extends through coil 54 to provide a pathway and exit port for filament 56 withdrawn from the coil. Payout tube 52 is configured to receive guide tube 16, as shown. The leading end of filament 56 is unwound from inner layer 62, and inserted through payout tube 52 to allow payout of the filament.

Coil 54 and payout tube 52 can be inserted into or otherwise encased in liner 50. After being sealed in liner 50, the sealed coil 54 may then be placed in box 48, as further shown in FIG. 3. Liner 50 preferably encases and seals payout tube 52, coil 54, and displaceable bodies 58 within box 48, and may be one or more polymeric bags, wrappings (e.g., shrink wrap liner), metallic foil casings, metalized-plastic bags (e.g., metal-coated plastic bags), and the like. In some embodiments, liner 50 desirably prevents or substantially prevents ambient conditions from reaching coil 54. For example, liner 50 may be a moisture-impermeable liner or sheath to provide a moisture barrier, a gas-impermeable liner or sheath to provide a gas barrier, a particulate-impermeable liner or sheath to provide a dust barrier, and the like. Liner 50 may also be opaque to reduce light exposure (e.g., ultraviolet light exposure), to reduce the risk of degrading filament 56 of coil 54 over extended periods of storage. However tight liner 50 is sealed, it is not generally able to secure the filament wind pattern from rearranging in an undesirable or entangled arrangement.

In the case of moisture-sensitive materials, filament 56 is desirably provided in a dry state (e.g., less than 300 parts-per-million by weight of water) to prevent moisture from negatively affecting the extrusion process. As such, liner 50 may provide a moisture barrier for filament 56 during transportation, storage, and use in system 10, and desiccant materials may be included in the consumable assembly to assist in drying filament 56 during storage, transportation, and use with system 10.

In an alternative configuration, liner 50 may be omitted and box 48 may provide the barrier against ambient conditions (e.g., moisture resistance). Guide tube 16 may extend through a sealed opening in box 48, adjacent to payout tube 52, to allow print head 18 to be loaded to head carriage 36 of system 10. In other configurations, box 48 may be omitted, and payout tube 52, coil 54, and displaceable bodies 58 may be retained and sealed solely within liner 50, or placed in another impermeable bag.

Guide tube 16 may be initially disconnected from payout tube 52, and liner 50 may be sealed over payout tube 52. The leading end of filament 56 may extend through payout tube 52 and be pressed against the outer side of coil 54 within liner 50. Prior to use in system 10, the user may puncture or otherwise open liner 50 at payout tube 52 and manually feed the leading end of filament 56 through guide tube 16. During use, guide tube 16 desirably extends through liner 50 in a sealed arrangement to maintain the barrier from ambient conditions. For example, guide tube 16 may be secured to an opening through liner 50 with a sealing adhesive. Payout tube 52 proves a pathway for filament 56 as it unwinds from coil 54.

The length of filament 56 may be any suitable length, and is preferably more than about 100 feet. For example, coil 54 of filament 56 may have an average outer circumference ranging from about 12 inches to about 24 inches, more preferably from about 16 inches to about 22 inches; an average inner diameter ranging from about 4 inches to about 12 inches, more preferably from about 6 inches to about 10 inches; and a depth of about 6-12 inches. When a spool-less coil 54 of filament 56 is created, the outermost diameter (at outer layer 64) is changeable. If pressure is applied to the the side of the coil 54 (in the non-radial direction, such as at sidewall 78), its thickness (between the opposed sidewalls 74) will be reduced, while the outermost diameter of the coil 54 will expand in an accordion-like fashion, due to the flexibility of the weave pattern. If the thickness of the coil is broadened, the outermost diameter of the coil will shrink in an accordion-like fashion. During the manipulation of diameter, the individual filament strands 56 may not stay properly in place, and the precise coil weave pattern may become shuffled or otherwise entangled.

As compared to a traditional spool wound on a hub, a spool-less hub has greater opportunity for entanglement during the filament unwinding/feeding process. With a spool-less coil, as can be appreciated, if filament 56 becomes entangled during payout, the resulting entanglement will be caught in guide tube 16 or print head 18 (or fail to even enter guide tube 16), preventing filament 56 from reaching a liquefier of print head 18. This would disrupt the printing operation in system 10, which relies on accurate timings of the deposited part and support materials, thereby impeding the printing operation.

One solution to avoiding entanglement is shown in FIGS. 2-5, using displaceable bodies 58 (a plurality of balls or other suitable bodies) that rest on inner layer 62 at the bottom of core region 68 under the weight of gravity. Displaceable bodies 58 are configured to press the inner windings of filament 56 against inner layer 62 of coil 54 until a sufficient radial force is applied to release filament 56, as is further described in U.S. Pat. No. 9,090,428, which is hereby incorporated by reference. This assists in allowing only a single loop of filament 56 to unwind at a time from coil 54, so as to avoid multiple loops of filament 56 from interacting and entangling during the feeding process. Liner 50 may be used to retain displaceable bodies 58 within core region 68.

After coil 54 (with payout tube 52 and displaceable bodies 58) is placed in liner 50, and a vacuum may optionally be drawn to collapse liner 50 around coil 54. This collapses liner 50 into core region 68 around payout tube 52, filament 56, and displaceable bodies 58, thereby restraining them in core region 68. Prior to use in system 10, a user may puncture or otherwise open liner 50 at payout tube 52. This equalizes the pressure within liner 50, which releases liner 50 from its collapsed state and allows it to expand out of core region 68. Filament 56 and displaceable bodies 58 are then capable of moving freely within core region 68.

As shown in FIGS. 3-5, during payout, print head 18 (or other drive mechanism) may pull or otherwise draw filament as an inner winding from inner layer 62 of coil 54, following the weave pattern. This is illustrated by arrow 72 in FIG. 5. Additional details relative to a coil assembly are described in Stratasys U.S. Pat. Nos. 9,090,428; 8,985,497 and 9,902,588.

Despite the care taken in packaging the prior art consumable assemblies, experience has demonstrated that filament entanglement issues do sometimes occur, resulting in filament payout failures, and that the likelihood of filament payout failures increases when consumable assemblies of the prior art experience unplanned or accidental external force. When coil 54 is exposed to unexpected forces, such as shock or vibration from dropping or jostling during shipping or transport, the overall coil diameter is affected, and thus the outer and inner layers of coil 54 can expand, shift or change shape, thereby disturbing the winding pattern of the filament 56 of coil 54, which will lead to increased entanglement and improper filament feeding during use. When the filament weave is changed or interrupted, it will cause entanglement during unwinding, and ultimately causing a printer feed error.

The present disclosure recognizes that deformation of the coil due to external forces is a cause of entanglements and payout failures and addresses this problem by applying a compressive force to the exterior generally cylindrical perimeter of the coil 54 using several embodiments of a compressive band that is secured around the outer layer 64 of coil 54 to place radial pressure on the outer circumference of the coil 54, thereby maintaining the shape and dimensions of coil 54 as manufactured. When the outermost diameter of the spool-less coil is constrained to prevent it from expanding larger (which would cause shrinking the thickness of the coil in a nonradial direction), the filament weave pattern within the coil is maintained in the original pattern, avoiding entanglement. Thus, the compressive band, while wrapped around the filament coil, maintains the coil's outside diameter and also holds the coil at an optimized coil thickness along the axial direction 60. The compressive band would not only maintain the coil diameter during shipping and transport, but also during filament feeding during printer use, since it does not impede feeding in any way.

Figure 6:
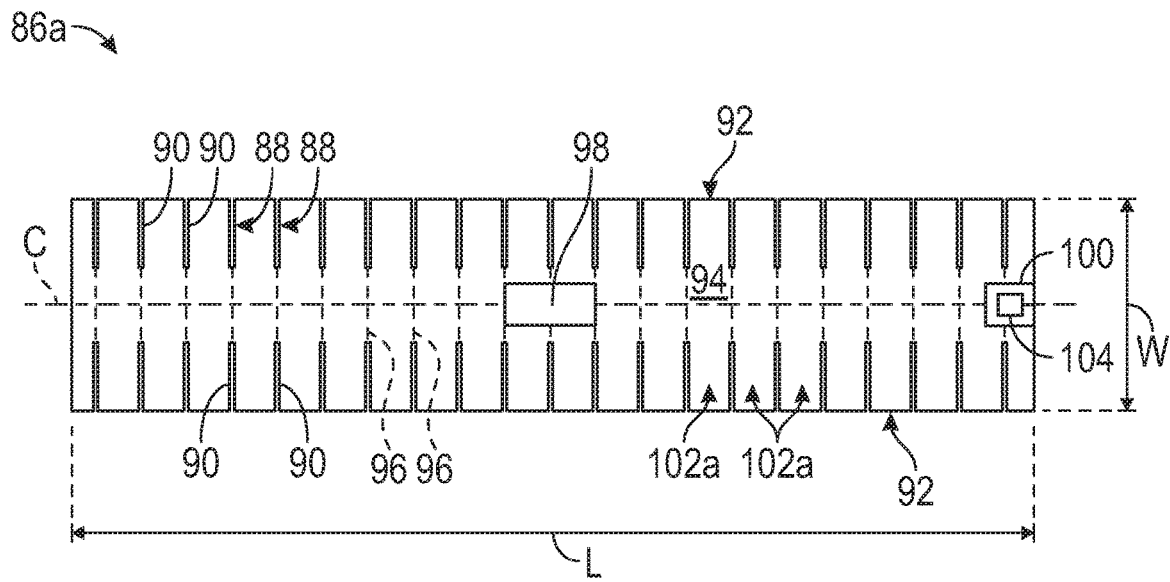
FIG. 6 is a plan view of a first embodiment of a compressive band.
Figure 7:
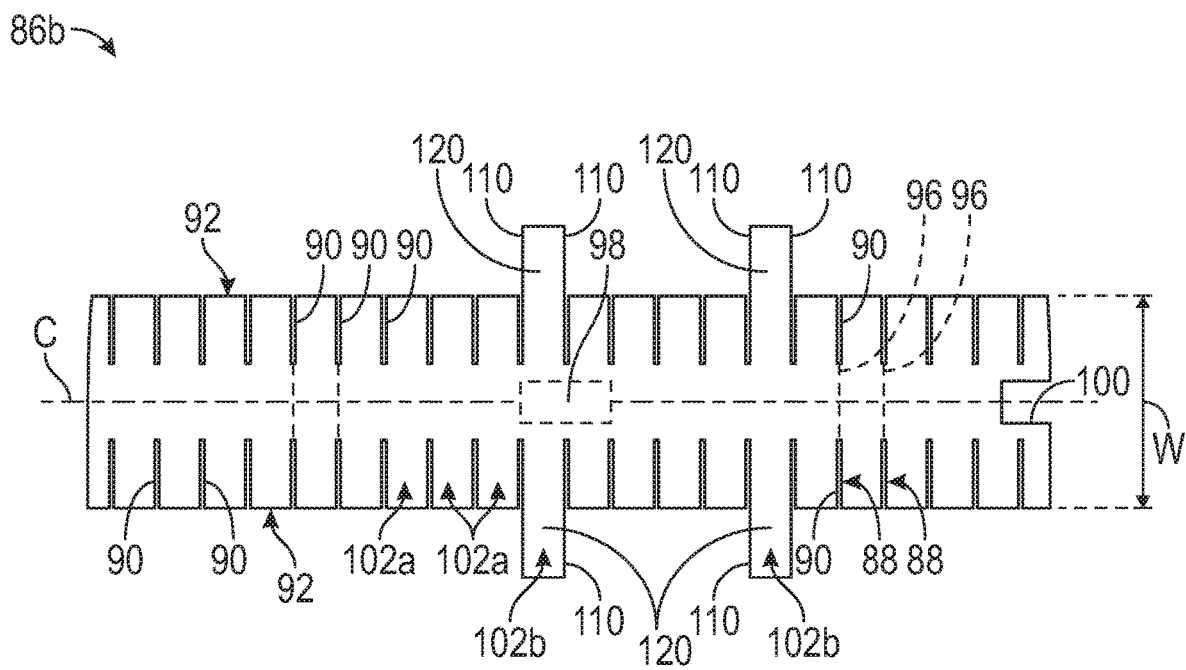
FIG. 7 is a plan view of a second embodiment of a compressive band.
Figure 12:
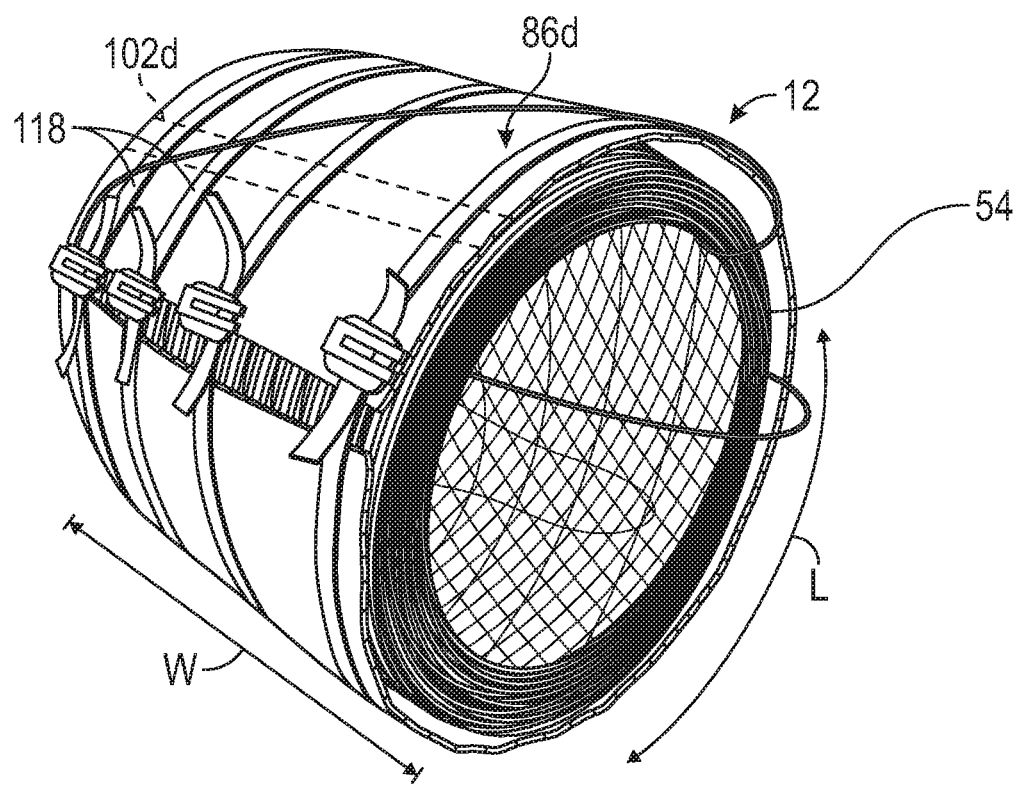
FIG. 12 is a perspective view of a fourth embodiment of a compressive band around a coil.
Figure 13:
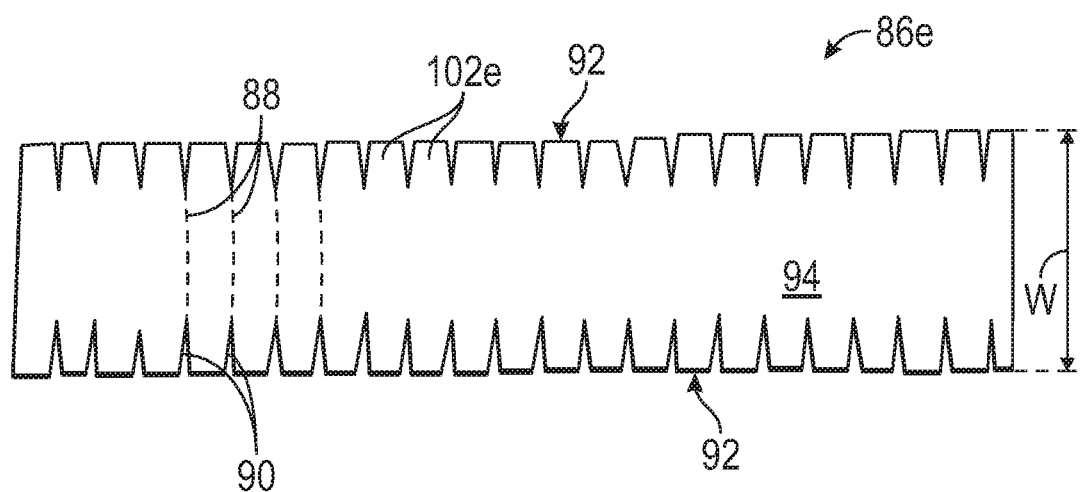
FIG. 13 is a plan view of a fifth embodiment of a compressive band.
Figure 14:
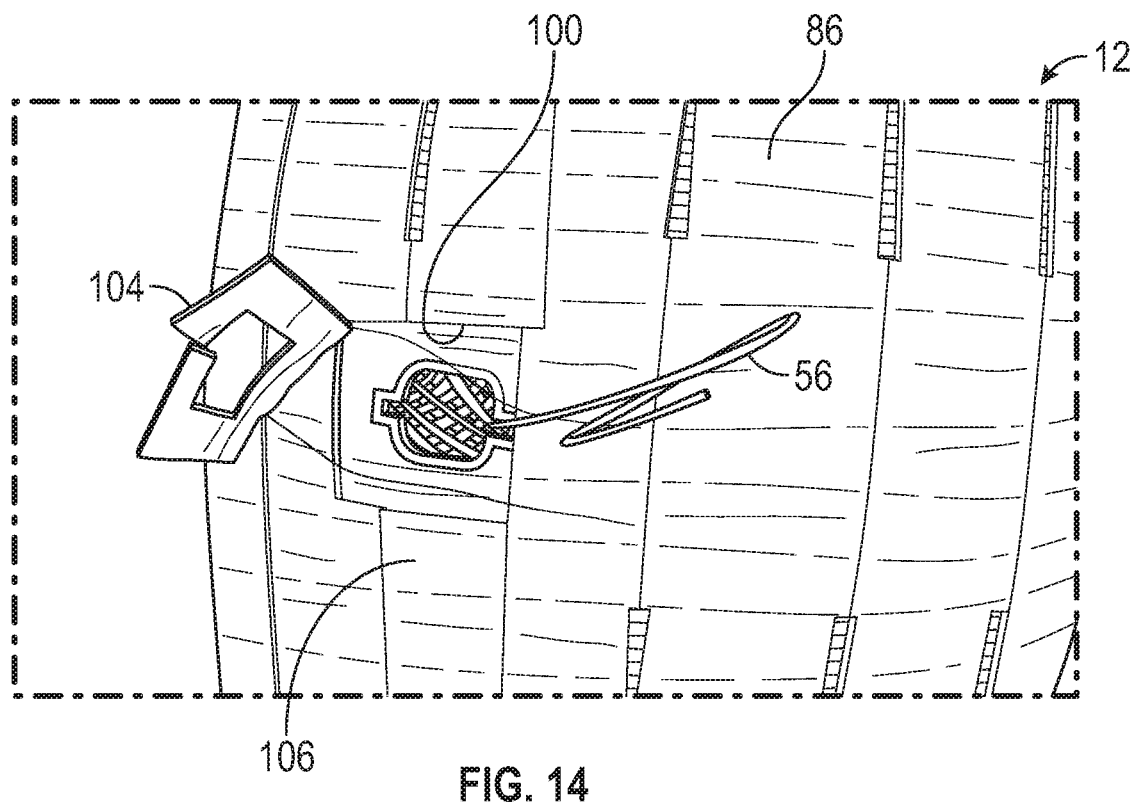
FIG. 14 is a partial perspective view of a coil wrapped in a compressive band and overwrap material.
Figure 15:
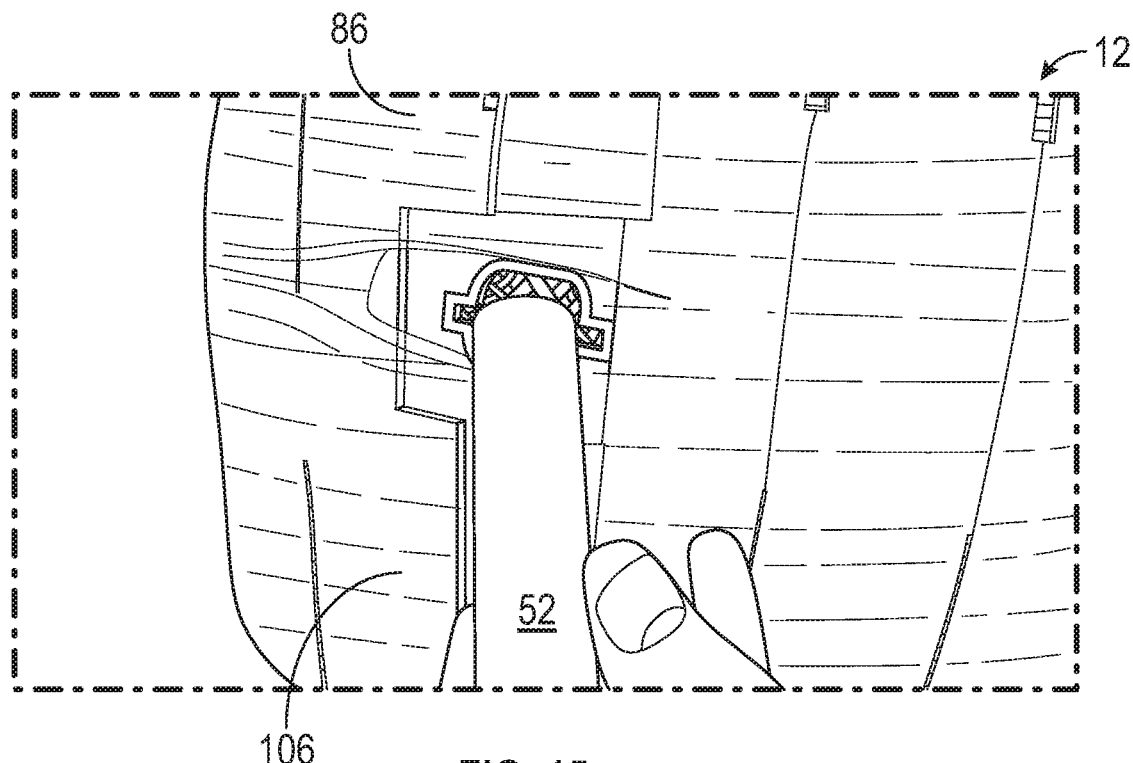
FIG. 15 is similar to FIG. 14 and shows insertion of a payout tube.
Figure 16:
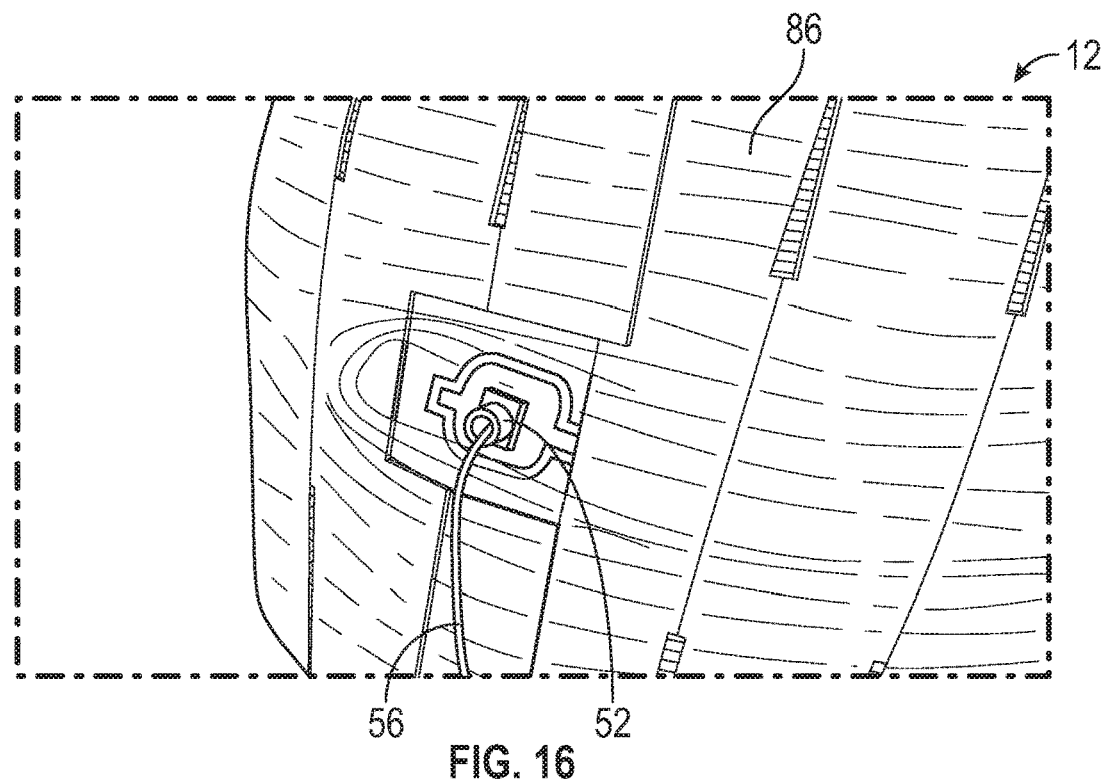
FIG. 16 is similar to FIG. 15, showing an installed payout tube and a portion of consumable filament extending from the payout tube.

FIG. 6 is a plan view of a first exemplary embodiment of a compressive band 86a. FIG. 7 is a plan view of a second exemplary embodiment of a compressive band 86b. FIG. 8 is a plan view of a third exemplary embodiment of a compressive band 86c with other components. FIG. 12 is a perspective view of a fourth exemplary embodiment of a compressive band 86d in use with coil 54. FIG. 13 is a plan view of a fifth exemplary embodiment of a compressive band 86e. In many respects, these embodiments of compressive bands share common features. Accordingly, in some cases, this description will refer to compressive band 86, and descriptions of compressive band 86 pertain to any or all of the embodiments 86a, 86b, 86c, 86d, 86e.

In exemplary embodiments, compressive band 86 is formed from a substantially planar substrate in sheet form that can be folded and bent, as will be described in more detail below. In exemplary embodiments, compressive band 86 has a substantially rectangular shape with a width W that approximates a non-radial thickness of coil 54 with which the compressive band 86 is configured to be used. Moreover, compressive band 86 has a length L that is perpendicular to the width and substantially corresponds to a circumference of the outer layer 64 of coil 54, wherein an overlap or gap is acceptable. Compressive band 86 is preferably rigid in the axial or width direction W to prevent collapse of a coil 54 contained therein. Moreover, compressive band 86 is preferably flexible in an annular direction formed by bending along length L to conform to the outer circumference of the coil 54. Slots or other geometrically shaped cuts 90 along the perimeter or lengthwise edges 92 optionally improve flexibility in this direction, as well as an improved ability for the compressive band to conform to an external perimeter surface of the coil, especially when the compressive band 86 is accompanied by an additional overwrap or shrinkwrap 106. In exemplary embodiments, cuts 90 are elongated and aligned substantially parallel to width W, which aligns with axial direction 60 when the compressive band 86 is attached to coil 54.

As shown in FIG. 12, for example, compressive band 86 is configured to bend along its length dimension L to wrap around the outer circumference of a coil 54 at outer layer 64. Especially in cases where outer layer 64 is not strictly cylindrical, such as where a "crowning" effect is exhibited (i.e., the circumference is slightly larger in a central region of the outer layer 64 remote from the edge regions near the lateral sidewalls 78), cuts 90 allow the compressive band 86 to tightly conform to the shape of outer layer 64. In the embodiments of FIGS. 6-8 and 13, bending along length L is facilitated by the provision of a plurality of substantially parallel lines of weakness 88. In exemplary embodiments, such lines of weakness 88 are provided through perforation, scoring, or other partial or full-depth cuts into and/or through a thickness of the substrate of compressive band 86. In the embodiments illustrated in FIGS. 6-8 and 13, a line of weakness 88 consists of slots or other geometrically shaped inserts 90 spaced apart along the lengthwise edges 92. In exemplary embodiments, substrate material is removed from the compressive band proximate lengthwise edges 92 to form the slots 90. As shown in FIG. 13, slots 90 can be triangular in shape, for example.

In an intermediate portion 94 of compressive band 86 remote from the lengthwise edges 92, no material is removed from compressive band 86 in some embodiments. However, due to the inherent weakness in the material proximate slots 90, the compressive band 86 has a tendency to bend along lines 96 connecting opposed slots 90.

Figure 19:
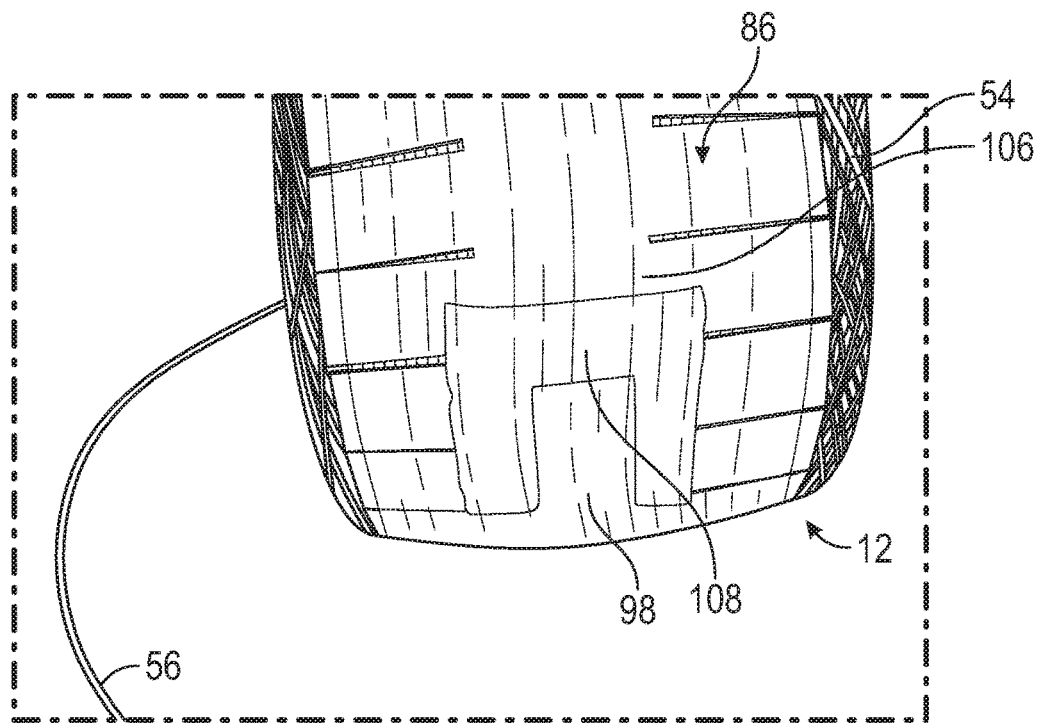
FIG. 19 shows the coil and compressive band of FIG. 17 from a different angle, so that a desiccant bag held on the compressive band by the overwrap layer is visible.
Figure 20:
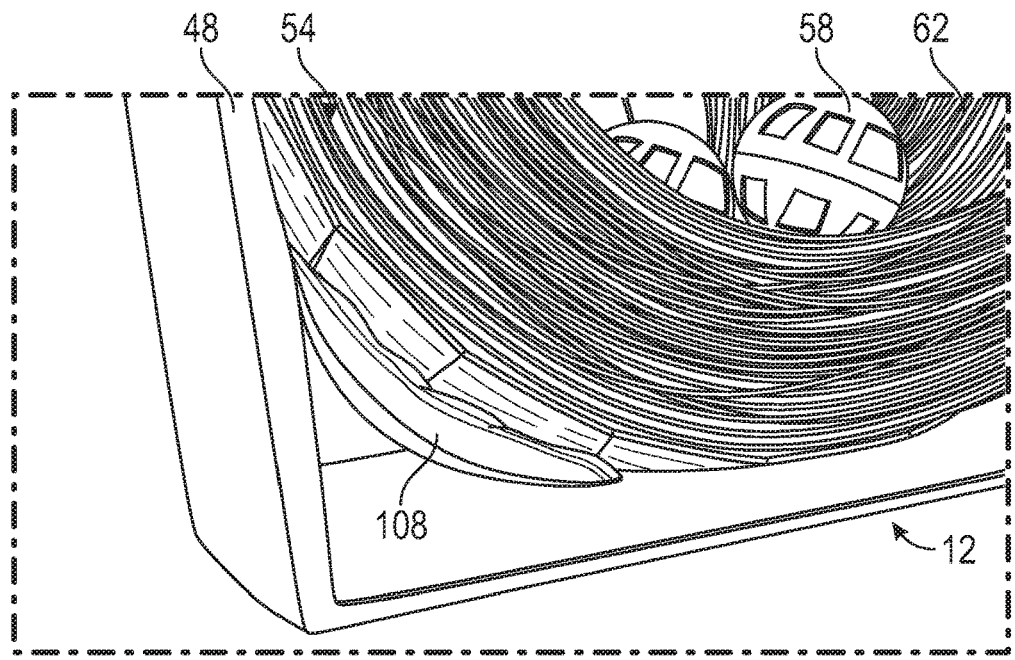
FIG. 20 shows a portion of the assembly of FIG. 19 in a container.

In exemplary embodiments, approximately midway along length L on compressive band 86, flap 98 is cut or otherwise provided on compressive band 86 for securing a desiccant bag or other accessory, as shown in FIGS. 19-20. In exemplary embodiments, at an end of compressive band 86, an opening such as notch 100 is provided either partially or fully cut, for the passage therethrough of payout tube 52. In other embodiments, the opening may be provided in other configurations, such as via a gap between ends of the looped compressive band 86. In exemplary embodiments, the lines of weakness 88 demarcate a plurality of panels 102 therebetween. In the embodiments of compressive band 86a, 86d, 86e of FIGS. 6, 12 and 13, each of the panels 102a, 102d, 102e has a consistent width dimension W. However, as shown in the embodiment of compressive bands 86b, 86c shown in FIGS. 7 and 8, several of the panels 102b have a greater width than the panels 102a. Tabs 120 extend beyond the width of lengthwise edges 92. In exemplary embodiments, each compressive band 86 is substantially symmetrical about a longitudinal center line C. As shown in FIG. 6, notch 100 is provided with a smaller interior aperture 104.

As shown in FIGS. 14-17, in an exemplary method for attaching compressive band 86 to coil 54, material from aperture 104 is removed to form notch 100, which allows for the passage of payout tube 52 through compressive band 86. In an exemplary method of securing compressive band 86 to coil 54, an overwrap 106 is secured to payout tube 52. In an exemplary embodiment, the overwrap 106 comprises wound layers of a stretchable polymer film material. In an exemplary embodiment, layers of stretch wrap are applied with tension to provide a compressive force (pressure) to the outer circumference of coil 54. In an exemplary embodiment, layers of stretch wrap are applied with tension to provide a taut and compressive overwrap source to the outer circumference of coil 54. If the compressive band 86 is made of a conformable, elastic material, an overwrap 106 may not be necessary.

Through payout tube 52, the user pulls out a portion of consumable filament 56 from inner layer 62. The user threads the end of filament 56 through payout tube 52. Thus, filament 56 of the coil is configured to be drawn from the inner layer 62 and through the payout hole 66 and through the filament outlet that includes payout tube 52 extending through notch 100 of compressive band 86.

Figure 17:
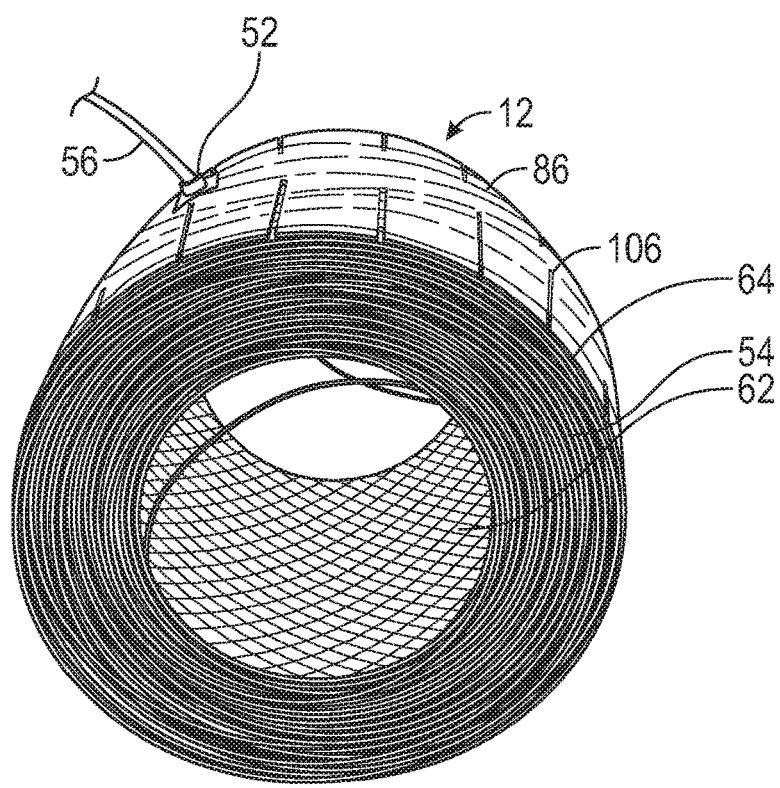
FIG. 17 shows an assembly of a coil and compressive band.

FIG. 17 is a perspective view of an assembly of coil 54, compressive band 86 and overwrap 106. Because compressive band 86 is secured to coil 54 in a manner that exerts even pressure about the outer circumference of coil 54 at outer layer 64, dimensional stability is thereby provided to the wound consumable filaments 56 of coil 54. Accordingly, even if coil 54 is dropped, jostled, or experiences shock or vibration, compressive band 86 maintains the coil shape, minimizes the coil diameter, keeping it more taut, and prevents the filament 56 at inner layer 62 from unwinding before a point in time of intended use.

Figure 18:
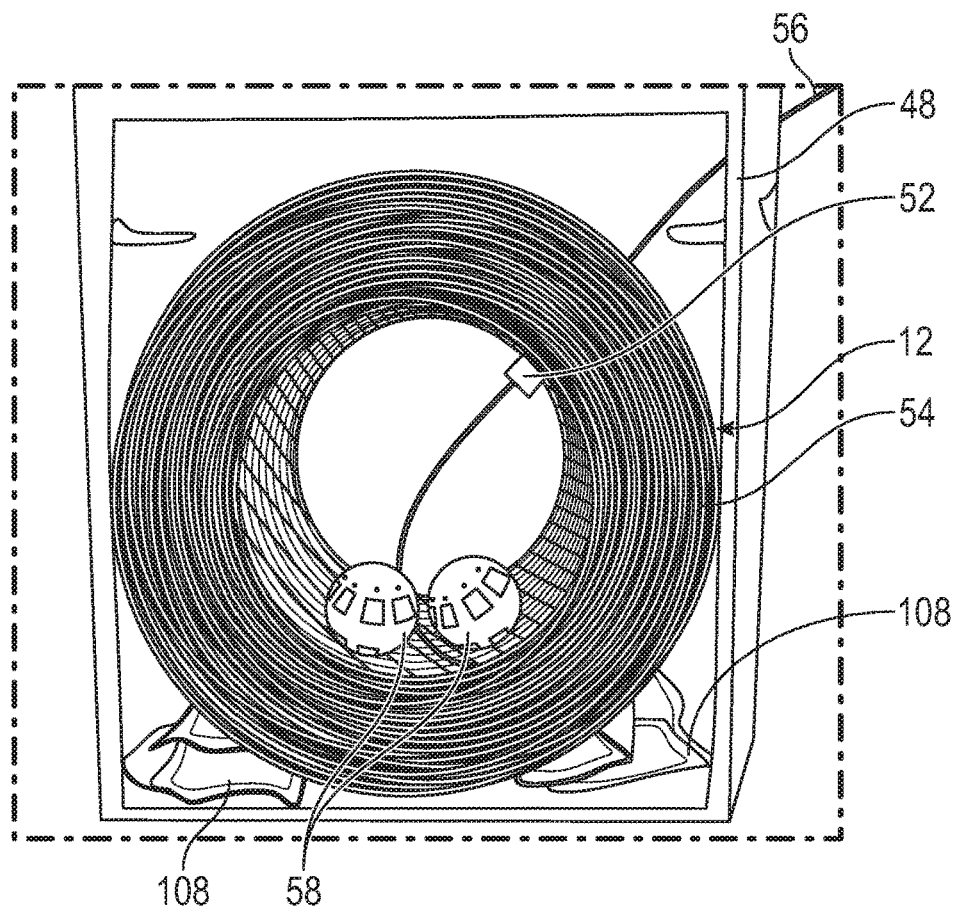
FIG. 18 shows the assembly of FIG. 17 inside a container.

FIG. 18 shows the assembly of FIG. 17 contained within a box 48, which also includes displaceable bodies 58 and desiccant bags 108. In FIG. 18, desiccant bags 108 are loosely placed into box 48 before the assembly of FIG. 17 is placed into the box. However, as shown in FIGS. 8-11, 19 and 20, alternative methods for providing desiccant bags 108 with coil 54 are described.

As shown in FIG. 19, desiccant bag 108 is tucked under a lifted flap 98 of compressive band 86. In the illustrated embodiments, the desiccant bag 108 is secured to the compressive band 86 by overwrap 106. FIG. 20 shows a partial view of the assembly of FIG. 19 positioned inside box 48, wherein desiccant bag 108 is positioned in a lower corner of the box 48, diametrically opposed from the location on coil 54 of payout tube 52 (shown in FIG. 18). In some embodiments, desiccant bags 108 may be taped internally within a wall of box 48.

As shown in FIG. 18, coil 54 is positioned within box 48 so that payout tube 52 is oriented relative to box 48 to properly locate the extending filament 56 for use in additive manufacturing system 10. However, because the coil 54 is round, it can rotate inside the box 48 due to vibration. Misalignment between the payout tube 52 and the box opening can result in small radius curves in the tubing that can in turn produce a high pull force. Thus, panels 102b can be used as feet in the configurations of FIGS. 21-23 to prevent the rotation of the wrapped coil 54 during shipment or other handling after manufacture.

Figure 21:
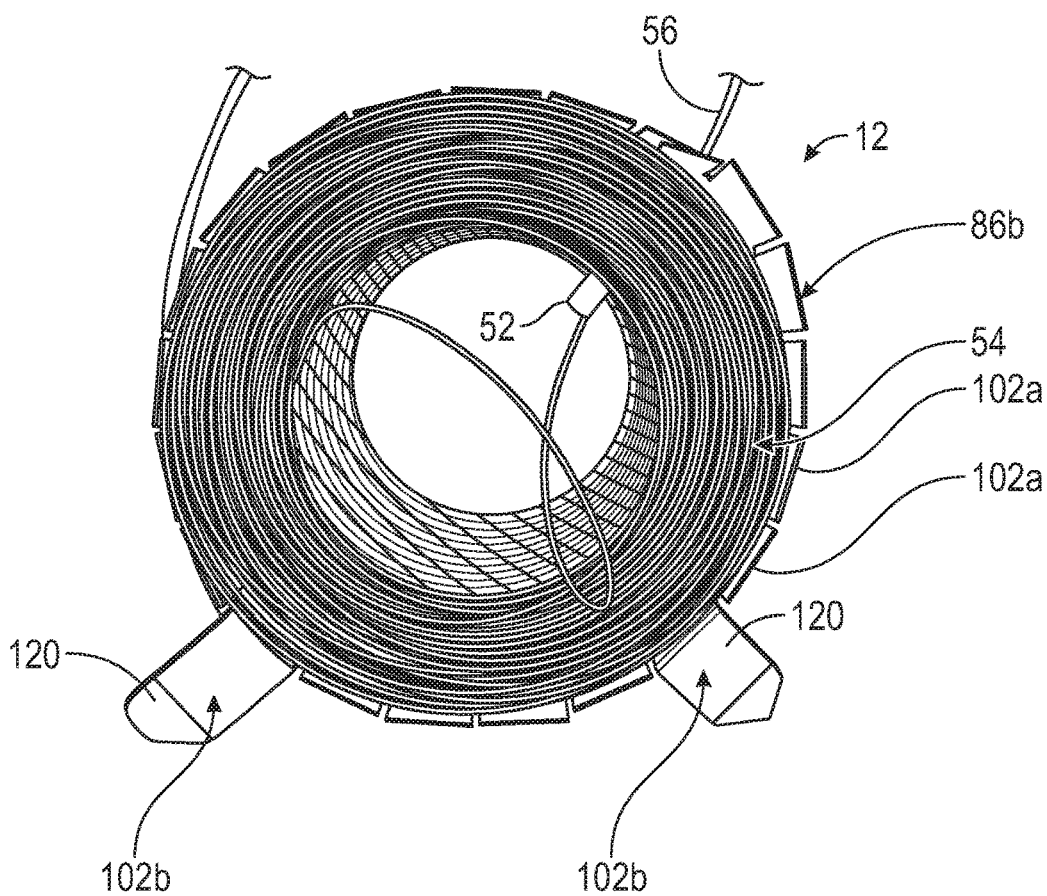
FIG. 21 is a side elevation view of an exemplary assembly embodiment having support feet.

FIG. 21 is a side elevation view of an assembly of coil 54 with compressive band 86b. To obtain this configuration, the tabs 120 of longer panels 102b of compressive band 86b are folded at approximately right angles to the tangent of the compressive band 86b surrounding the circumference of coil 54. Corners 110 of each tab 120 are folded at approximately 45 degree angles to form feet by which the assembly can be positioned to insure that the coil position is held constant within the box, to maintain alignment of the payout tube 52 with the filament exit hole in the box 48.

Figure 9:
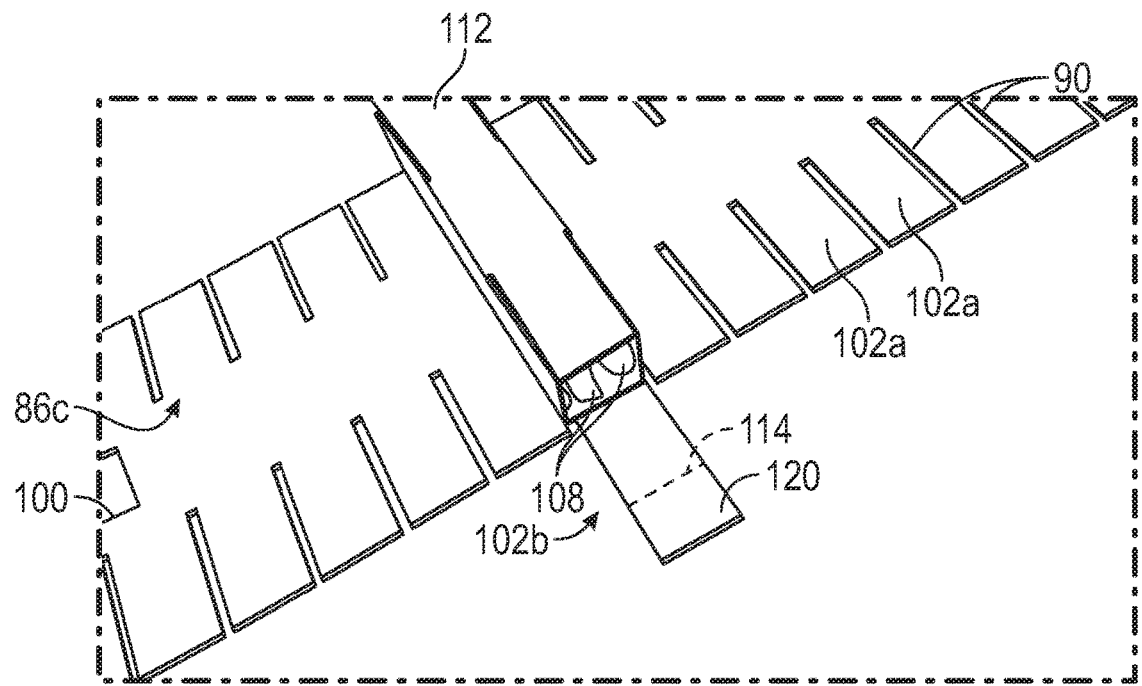
FIG. 9 shows placement of a desiccant box on the compressive band of FIG. 8.
Figure 10:
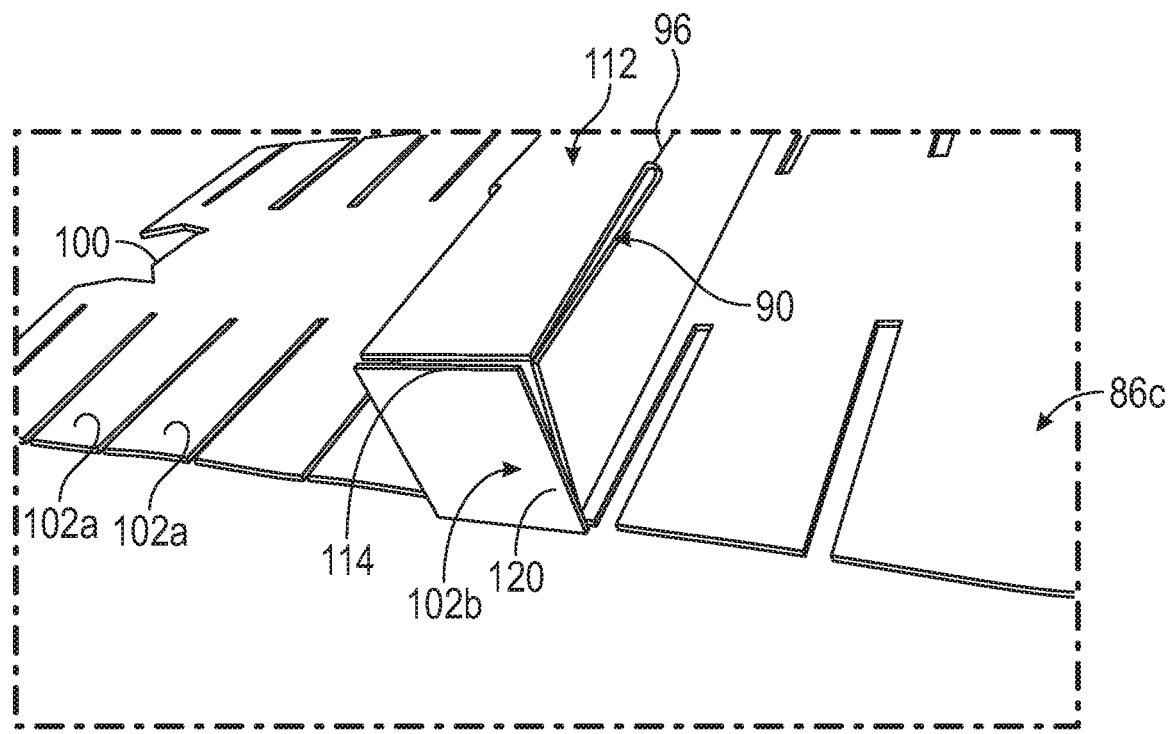
FIG. 10 shows the closed desiccant box end.
Figure 11:
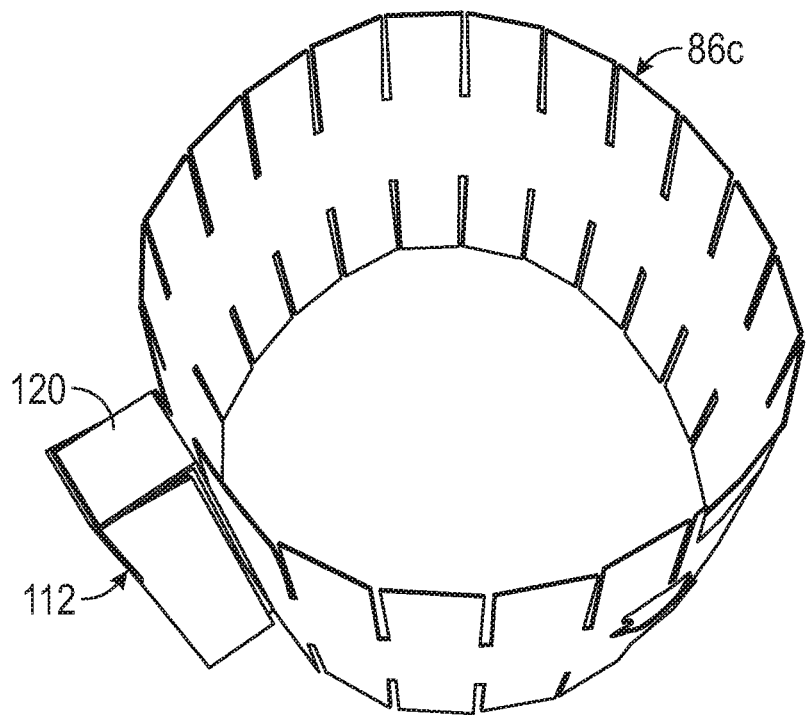
FIG. 11 shows the compressive band of the third embodiment with an assembled desiccant box.

FIG. 8 is a plan view of components of a third embodiment of a compressive band 86c, including a desiccant box 112 shown in a folded configuration at reference number 3 and in a flat configuration at reference number 4. Compressive band 86c is similar to compressive band 86b but has only one longer panel 102b and a pair of oppositely extending tabs 120. Desiccant box 112, shown in a flat configuration at reference number 4, is formed of a similar material as compressive band 86 and in an exemplary embodiment has a common width W with compressive band 86. In an exemplary embodiment, desiccant box 112 is formed of a substantially planar substrate having lines of weakness 88 to allow for folding into an open-ended box with a substantially square cross-section. In an exemplary embodiment, each line of weakness 88 is similar to that of compressive band 86, including cut-out slots 90 that promote bending along bend line 96. As shown in FIGS. 9-11, to attach desiccant box 112 to compressive band 86c, the open edge of the folded desiccant box 112 is turned downward to face compressive band 86c at panel 102b. Desiccant bags 108 are inserted into the desiccant box 112 (or box 112 is wrapped around the desiccant). As shown in FIGS. 9 and 10, tab 120 of panel 102b is folded along line 114 and an end thereof is inserted into the folded desiccant box 112 to secure and close the open ends of the box 112. FIG. 11 shows compressive band 86c with connected desiccant box 112, wherein the length of the wrap 86c is bent into a circular or ring configuration. As shown in FIG. 10, the slots 90 of desiccant box 112 promote airflow into and out of the desiccant box 112 so that desiccant bags 108 contained therein are able to absorb and retain moisture from air outside of box 112 (and inside a box 48 that contains the wrapped coil 54 secured in compressive band 86).

Figure 22:
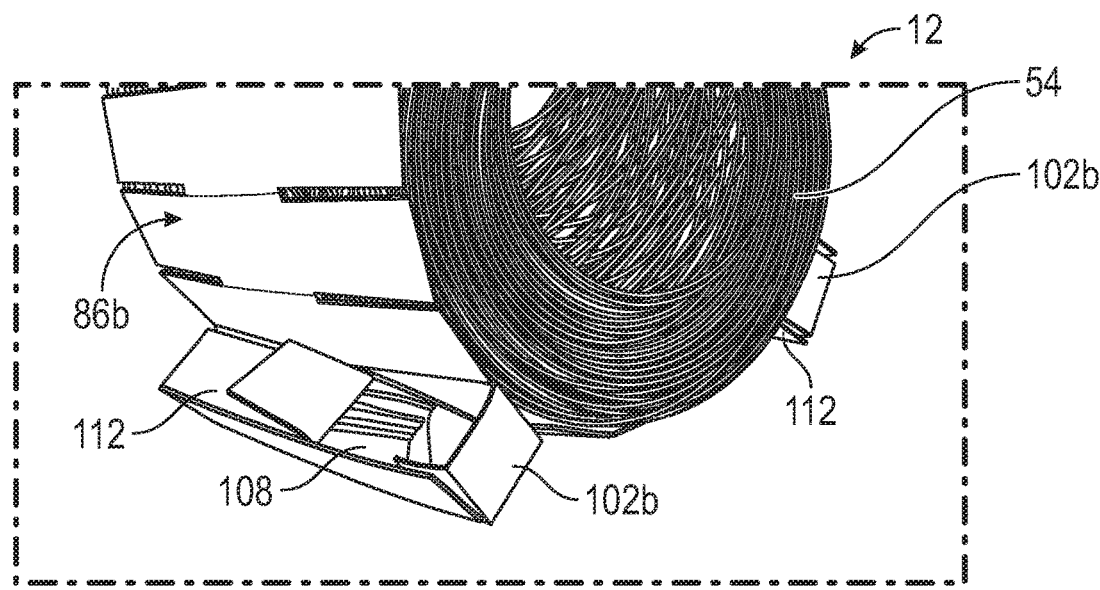
FIG. 22 shows a compressive band assembly having desiccant boxes that serve as support and location feet.
Figure 23:
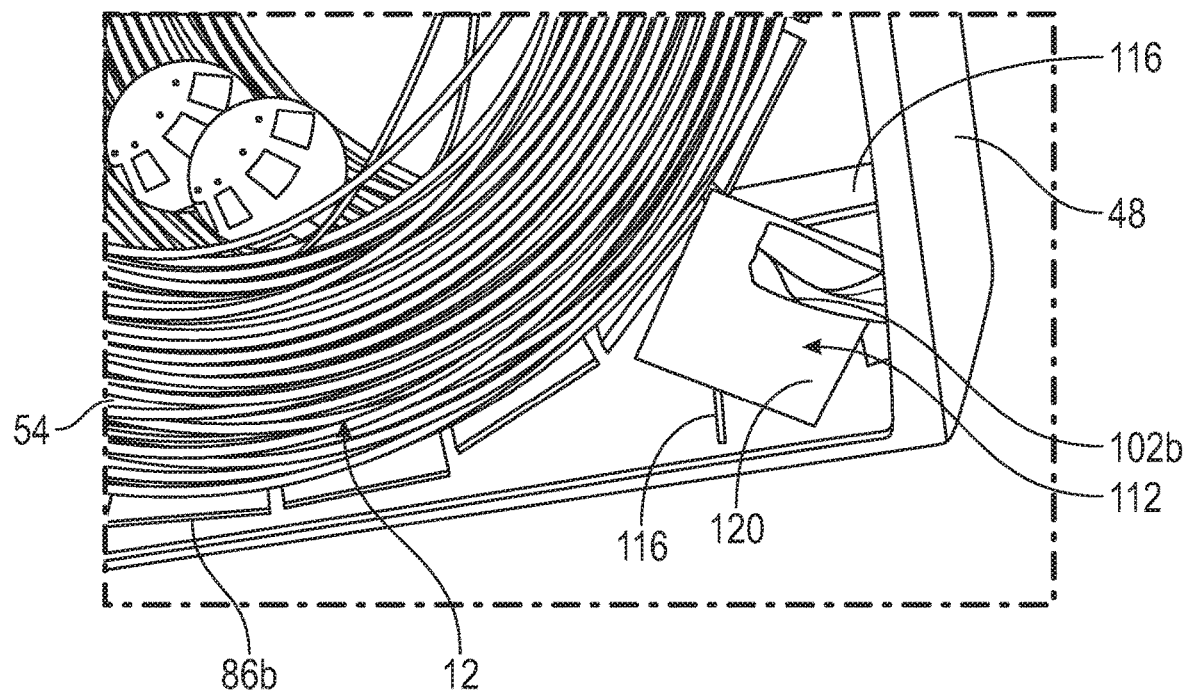
FIG. 23 shows a partial view of the assembly of FIG. 22 inside a container.

FIG. 22 shows an assembly of coil 54 and compressive band 86b, wherein optional desiccant boxes 112 are attached at both longer panels 102b. The assemblies of FIGS. 21 and 22 are similar in that the panels 102b are positioned and folded to serve as feet to prevent rolling or rotation of the coil 54, whether on a surface as shown in FIGS. 21 and 22, or in a box as shown in FIG. 23. Thus, the panels 102b are positioned and sized relative to a coil 54 to extend from bottom corners of a wrapped coil. As shown in FIG. 22, to promote even more airflow, a portion of desiccant box 112 can be folded back at air slots 90 to allow enhanced fluid exchange between the desiccant (in bag or other form) contained within box 112 and an environment outside desiccant box 112. Moreover, as shown in FIG. 23, box 48 may include locating features such as flaps 116 to secure the wrapped coil in position within box 48.

FIG. 12 is a perspective view of a compressive band 86d secured to coil 54 by a plurality of ratchet straps 118. It is contemplated that other methods for securing compressive band 86 on coil 54 can also be used, including but not limited to the use of tape, buckles, latches, and other fasteners, stretch coverings, and straps. Suitable methods for attaching compressive band 86 to coil 54 preferably allow for exertion of a relatively even compression force or tension around the circumference of coil 54. The amount of compression can be adjusted by changing the tension used to apply the stretch material of overwrap 106 and by changing the material and configuration of compressive band 86, overwrap 106, or other band fastener. Compression is provided in a radial direction from the outer layer 64 of coil 54 toward core region 68. The compression in the radial direction of the coil provides stability to the individual wind locations and makes the coil more tolerant to jostling and entanglement issues which would otherwise occur if the coil was unrestrained.

In the illustrated embodiments, radial compression on coil 54 is provided by overwrap 106 and/or straps 118 on compressive band 86, though other methods may also be suitable. For example, a compressive band 86 formed of elastic material may itself provide the necessary compressive force on coil 54 without other structures. Moreover, a compressive wrapping of stretch material on coil 54 itself may serve as a compressive band that is not configured as shown with respect to reference number 86. In an exemplary embodiment, overwrap 106 has the same width as the filament coil 54 and holds the compressive band 86 in close contact to the outer circumference of the filament coil 54 at outer layer 64. Optionally, overwrap 106 also holds the desiccant bags 108 at the corner positions within box 48 via flap 98 of compressive band 86.

In some exemplary embodiments, compressive band 86 is formed from a planar sheet made of plastic and/or paper based materials. In an exemplary embodiment, the components are formed of cardboard, paperboard, woven material, or flexible plastic with a thickness of about 1/16 inch to about 1/4 inch. However, it is contemplated that other materials and thicknesses are also suitable. Desirable properties include in-plane stiffness, inextensibility (i.e., non-stretchability), light weight, and flexibility to bend to conform to the generally cylindrical shape of coil 54.

Although the present disclosure may have been described with reference to preferred embodiments, workers skilled in the art will recognize that changes may be made in form and detail without departing from the scope of the disclosure.

The invention claimed is:

1. A consumable assembly for use in a 3D printing system, the consumable assembly comprising:
    a spool-less coil of filament, the coil having an inner layer defining an open core region, an outer layer offset from the inner layer and defining an exterior generally cylindrical geometry of the coil, and substantially flat opposing side surfaces, the coil further having a payout hole extending from the inner layer of the coil to the outer layer of the coil;
    a payout tube positioned in the payout hole and having a filament outlet proximate the outer layer to guide withdrawal of filament from the inner layer;
    a compressive band disposed over the outer layer and configured to exert a compressive radial force on the coil sufficient to maintain the exterior generally cylindrical geometry of the coil, wherein the filament outlet is accessible through an opening in the compressive band; and
    wherein a filament of the coil is configured to be withdrawn through the payout tube and the filament outlet without rotation of the coil, beginning from the inner layer and moving towards the outer layer as the filament is withdrawn.

2. The consumable assembly of claim 1 further comprising an overwrap disposed over the compressible band.

3. The consumable assembly of claim 2 wherein the overwrap comprises a stretchable polymer material.

4. The consumable assembly of claim 2 wherein the overwrap comprises a strap.

5. The consumable assembly of claim 1, and further comprising a plurality of individually displaceable bodies positioned in the core region.

6. The consumable assembly of claim 5, and further comprising a liner, wherein the coil and the plurality of individually displaceable bodies are disposed in the liner.

7. The consumable assembly of claim 1, wherein the compressive band has a width between two opposed longitudinal edges and further comprising a plurality of elongated cuts oriented in the width direction and spaced apart along at least one of the longitudinal edges.

8. The consumable assembly of claim 1, wherein the compressive band comprises a substantially rectangular sheet material having a width and a perpendicular length, the length of the compressive band being substantially equal to a circumference of the outer layer of the coil.

9. The consumable assembly of claim 8, wherein the width of the compressive band is substantially equal to a width of the coil.

10. The consumable assembly of claim 1 further comprising a desiccant attached to the compressive band.

11. The consumable assembly of claim 1 wherein the compressive band comprises a portion extending from a bottom thereof and configured to prevent rotation of the consumable assembly.

12. A method of delivering consumable filament to a 3D printing system, the consumable filament provided in an assembly comprising:
    a spool-less coil of the filament, the coil having an inner layer defining an open core region, an outer layer offset from the inner layer and defining an exterior generally cylindrical geometry of the coil, and substantially flat opposing side surfaces, the coil further having a payout hole extending from the inner layer of the coil to the outer layer of the coil;
    a payout tube positioned in the payout hole and having a filament outlet proximate the outer layer to guide withdrawal of the filament from the inner layer; and
    a compressive band disposed over the outer layer and configured to exert a compressive radial force on the coil sufficient to maintain the exterior generally cylindrical geometry of the coil, wherein the filament outlet is accessible through an opening in the compressive band;
the method comprising:
    withdrawing the filament through the payout tube and the filament outlet without rotation of the coil, beginning from the inner layer and moving towards the outer layer.

13. The method of claim 12 further comprising delivering the filament to a print head of the 3D printing system.

14. The method of claim 12 further comprising coupling the filament outlet to a first end of a guide tube of the 3D printing system.

15. The method of claim 14 further comprising coupling a second, opposing end of the guide tube to a connector.

16. The method of claim 15 further comprising coupling the connector to a print head of the 3D printing system.

17. The method of claim 15 further comprising coupling the connector to an adaptor of the 3D printing system.

18. The method of claim 15 further comprising coupling the connector to a printer engagement key of the 3D printing system.

* * * * *